United States Patent [19]

Hanesian et al.

[11] Patent Number: 5,984,578
[45] Date of Patent: Nov. 16, 1999

[54] APPARATUS AND METHOD FOR IN SITU REMOVAL OF CONTAMINANTS USING SONIC ENERGY

[75] Inventors: Deran Hanesian, Nutley; Angelo J. Perna, Ringwood; John R. Schuring, Blairstown; Hugo J. Fernandez, Union City, all of N.J.

[73] Assignee: New Jersey Institute of Technology, Newark, N.J.

[21] Appl. No.: 08/832,726

[22] Filed: Apr. 11, 1997

[51] Int. Cl.⁶ .............................. B09C 1/00; E21B 43/25; E21B 43/26
[52] U.S. Cl. ...................... 405/128; 166/177.2; 166/249; 166/308; 405/129; 405/131; 588/227
[58] Field of Search .............................. 166/177.1, 177.2, 166/177.5, 249, 308; 210/170, 747; 405/128, 129, 131; 588/212, 227

[56] References Cited

U.S. PATENT DOCUMENTS

| | | |
|---|---|---|
| 3,072,094 | 1/1963 | Cole et al. . |
| 3,520,362 | 7/1970 | Galle ................................. 166/177.2 X |
| 3,842,909 | 10/1974 | Baker et al. ............................. 166/249 |
| 4,548,281 | 10/1985 | Bodine ................................. 166/249 X |
| 4,558,658 | 12/1985 | Sommer et al. . |
| 4,615,530 | 10/1986 | Powell . |
| 4,649,853 | 3/1987 | Powell . |
| 4,807,203 | 2/1989 | Powell . |
| 5,032,042 | 7/1991 | Schuring et al. . |
| 5,098,538 | 3/1992 | Kim et al. . |
| 5,120,160 | 6/1992 | Schwengel .............................. 405/128 |
| 5,150,988 | 9/1992 | Powell et al. ........................ 405/128 X |
| 5,198,122 | 3/1993 | Koszalka et al. . |
| 5,370,477 | 12/1994 | Bunin et al. ............................. 405/128 |
| 5,449,249 | 9/1995 | Husten .................................... 405/128 |
| 5,560,737 | 10/1996 | Schuring et al. . |
| 5,597,265 | 1/1997 | Gallo ..................................... 405/128 |
| 5,826,653 | 10/1998 | Rynne et al. ............................ 166/245 |

FOREIGN PATENT DOCUMENTS 605231   4/1978   U.S.S.R. .

OTHER PUBLICATIONS

U.S. E.P.A. (1993), Cincinnati, OH 45268, EPA/540/AR–93/509.

U.S. E.P.A. (1993), Cincinnati, OH 45268, EPA/540/RI–93/505.

Bennedsen (1987), Pollution Engineering, 66–68.

Valentine et al (1986), In: Biotransformation, Lewis Pub. Chapter 9.

Wetzel et al. (1985) Demon. in Situ Biol. Degrad. Conta. G. Water Soils, 6th Natl. Conf. Mana. Uncontrol. Hazard. Waste Sites, Washington, DC.

Yaniga, et al. (1986) Aquifer Rest. Acce. in Situ Biodeg. Org. Contam., 7th Natl. Conf. Manna. Uncontrol. Hazard. Waste Sites, Washington, DC.

Aident et al. (1987), 24th AICHE/ASME National Heat Transfer Conference, Pittssburgh, PA, pp. 407–412.

Howard et al (1970), Hydraulic Fraturing Millet the Printer, Dallas, Tex.

Hubbert (1957), Trans. Inst. Min. Engrs, 210:153–168.

Kehle, R.O. (1964), J. Geophys. Res. 69:259–273.

Bertrand (1964), Annls. Ponts Chauss., 134:473–522.

Allen et al. (1947), J. of Acoustical Society of America, 19:857–865.

(List continued on next page.)

*Primary Examiner*—George Suchfield
*Attorney, Agent, or Firm*—Klauber & Jackson

[57] ABSTRACT

In preferred embodiments, an apparatus and method for enhancing the in situ removal of at least one contaminant from a contaminated body, the body being provided with at least one interstice, by generating and focusing vibrations toward the interstice, thereby exciting the contaminant within the body, whereby transport of the contaminant out of the body is facilitated. Preferably, the vibrations are sonic or ultrasonic. Vacuum extraction or transformation of the contaminant may also be effected.

48 Claims, 16 Drawing Sheets

OTHER PUBLICATIONS

Meyer et al. (1972), Physical and Applied Acoustics; An Introduction, pp. 392–395, Academic Press, New York and London.

Sears et al (1986) In: Univeresity Physics, 7th edition, Addison–Wesley Publish Com., Massachusetts, pp. 512, 516.

Soloff, R.S. (1964) J. Acoust. Soc. Am. 36:961–5.

Cracknell (1980), In: Ultrasonics, Wykeham Publish, London, pp. 2–3.

Crawford (1995), In: Ultrasonic Engineering, Butterwor. Sci. Pub., London, pp. 1–137.

Chedd, G. (1970) In: Sound, From Communication to Noise Pollution Doubleday & Company Inc., Garden City, NY, pp. 93–97.

Wood (1987) In: A Textbook of Sound, Macmillan Com., NY, pp. 224–227.

Boucher, R.M.G. (1961) Chem. Engineer., Oct. 2, pp. 84–100.

Gallego–Juarez (1989) J. Phys. E. Sci. Instrum. 22:804–16

Brun et al. (1957) J. Acoust. Soc. Am. 29:573–83.

Manthey et al. (1991) Ultrason. Transduc. Transduc. Arr. App. Air, pp.

Allen et al. (1959) J. Acoust. Soc. Am. 31:177–85.

APPARATUS AND METHOD FOR IN SITU REMOVAL OF CONTAMINANTS USING SONIC ENERGY

BACKGROUND OF THE INVENTION

The present invention relates to in situ contaminant removal generally and, more particularly, but not by way of limitation, to a novel method and means of enhancing the in situ removal of a contaminant from a contaminated body, such as a geologic formation, by application of sound-based vibrational energy.

DESCRIPTION OF THE RELATED ART

Contamination of soil and ground water is presently one of the major environmental concerns, particularly in the United States and other industrial countries. In some areas, subsurface contamination has reached a level and extent which pose a serious threat to human health and the environment.

Thus, the removal of hazardous substances from soil and rock has become a major environmental concern. Low permeability geomaterials such as silt, clay, or tight bedrock present a special remediation challenge, since they exhibit low transport rates and high adsorption potential. Available and emerging treatment technologies may be generally classified as ex situ (above ground) or in situ (below ground). Of these, the latter approach is generally preferred since it is less costly, and also minimizes potential exposures. Thus, when remediating contaminated soil and ground water at industrial sites, in situ approach is preferred. It is the least costly, and it also minimizes potential contaminant exposure routes. The effectiveness of in situ remediation technologies is typically highly dependent on the transport characteristics of the geologic formation under treatment. In formations such as sand and gravel with high permeabilities, in situ treatment is usually highly successful. However, in situ remediation in geologic formations containing silt, clay, or tight bedrock is usually more difficult due to the characteristic low permeability and high adsorption potential of these geologic materials.

Various fracturing technologies are now receiving considerable industrial attention since they address a problem which has plagued environmental clean-up efforts to date, i.e. remediation of low permeable geologic formations.

Two recent in situ technologies which have emerged to enhance the removal of contaminants from low permeability soil and rock formations are pneumatic fracturing and hydraulic fracturing. Pneumatic fracturing applies short bursts of pressurized air (500 psig) to create back pressure in a geologic formation, which propagates artificial fractures through the formation [U.S. Environmental Protection Agency, "Accutech Pneumatic Fracturing Extraction and Hot Gas Injection, Phase 1," U.S. Environmental Protection Agency, Cincinnati, Ohio 45268, EPA/540/AR-931509, July 1993]. The pneumatic fracturing process may be supplemented by the simultaneous injection of atomized liquids or granulated materials. Hydraulic fracturing is somewhat more involved, and utilizes a high pressure water jet (3500 psig) which notches the formation, followed by an injection of a slurry of coarse sand and a viscous fluid (gum base gel with water and an enzyme) to propagate the fracture [U.S. Environmental Protection Agency, "Hydraulic Fracturing Technology Application Analysis and Technology Evaluation Report," U.S. Environmental Protection Agency, Cincinnati, Ohio 45268, EPA/540/RI-93/505, October 1993]. An enzyme breaks down the gel following deposition of the slurry into the fracture. Both technologies are designed to create permeable channels in the formation to increase mass transfer rates. When coupled with primary technologies such as vapor extraction, bioremediation, or thermal technologies, the removal and/or treatment of the contaminants is enhanced.

Various other technologies are being developed for the in situ removal of contaminants, particularly volatile organic compounds (VOCs) from geologic formations. Such treatment technologies include vapor extraction, biodegradation, soil washing and thermal treatment.

Several factors influence volatilization from soil. Temperature is one of the major factors that must be taken into account. Volatilization increases significantly as temperature increases because of the increase in vapor density and thereby the increase of vapor diffusion. Chemical concentration increases will increase volatilization considering that the chemical's vapor density is not saturated. Decreasing water content increases the vapor diffusion and volatilization. Finally, the wind speed increases volatilization because it improves mixing with the atmosphere and can increase volatilization.

Vapor extraction is a process for the in situ removal of volatile organic compounds (VOC) by mechanically extracting soil gas from a contaminated zone. One or more vertically oriented perforated vent wells are installed in the contaminated zone in the ground, and air is forced to travel through the pore space in the soil, causing volatilization of the liquid and adsorbed volatile organic compounds. The extracted soil gas is then either vented to the atmosphere or directed into an emission control system, typically depending on the concentration.

Two major variations of the vapor extraction process have been demonstrated successfully, namely an in situ air stripping process and a vacuum extraction process.

In the in situ air stripping process, a series of interconnected air injector vents are supplied with forced air by an above ground blower and manifold system that forces the air into the soil through the perforated vent wells. A separate blower and manifold system is used to apply negative pressure to air extraction vents to withdraw the soil gas. The injection and extraction vents typically are located alternately within the array of vent wells on the site. To achieve a degree of flow containment, extraction vents are placed on the perimeter of the area being treated.

Tests have shown the air stripping process to be effective in removal of VOC and that air stripping functions best with high permeable soil such as loose, sandy soils. It was therefore concluded by those testers that the process would be much less effective in tightly packed soils and in soils with a high clay content.

A second variation of the vapor extraction process is vacuum extraction. As with in situ air stripping, vacuum extraction provides at least one perforated vent well installed in the contaminated zone. A vacuum pump is installed on the wells and induces a negative pressure gradient around the well to remove the VOC along with the soil gas. Various examples of usage thereof include leakage of carbon tetrachloride from an industrial tank farm into a clay-like residual soil in a karst area in Puerto Rico, a surface spillage of acetone and methylene chloride around underground storage tanks, in which a vacuum extraction system was used to reduce the contamination to an acceptable limit. Even though the soil at the sites consisted of mixed silts, sands and clays, the vacuum wells developed a radius of influence up to 17 feet. High recovery rates have also been reported using vacuum extraction to withdraw gasoline and residual hydrocarbons from gravel backfill around leaking underground storage tanks.

A summary of the design considerations of vacuum extraction systems is provided in the article "Vacuum Extraction From Soil" by M. B. Bennedsen, *Pollution Engineering*, February 1987, pages 66–68. In the article, it is concluded that vacuum extraction has been used successfully on soils in a range of permeability from $1\times10^{-4}$ to $1\times10^{-8}$ cm/sec. Other important design parameters include the depth to the water table, the air emission control and short circuiting of air from the ground surface. In order to control the latter, a cover is sometimes installed over the area.

Biodegradation is another process which has effectively been used in the treatment of soils contaminated with hazardous organic compounds. Specifically, with biodegradation or bioremediation, the environmental conditions in the soil are altered to enhance microbial catabolism or to cometabolise the organic contaminant, thus transforming it into a simpler, non-toxic product. In most applications, indigenous microorganisms are utilized, although seeding of the soil with indigenous microorganisms has also been used where natural occurring organisms are unable to degrade the contaminants.

Microorganisms can be classified into three main categories, namely (1) aerobic, which grow only in the presence of oxygen, (2) anaerobic, which grown only in the absence of oxygen, and (3) facultative anaerobic, which can grow either in the absence or presence of oxygen. The biodegradation method which has been found most effective in treatment of the vadose soil zone, the uppermost layer of the terrestrial environment has been the aerobic microbial process. With this process, oxygen and often nutrients are injected or infiltrated into the subsurface environment, using wells or a percolation process. For example, wells are drilled into the soil and nutrients for feeding the microbes are dropped down into the well, or microbes are seeded in the well. Thereafter, the microbes are blown outwardly by forced air or the like. A concise summary of the major factors which affect the rage of biodegradation in the vadose zone are described by R. L. Valentine et al. in "Biotransformation" in *Vadose Zone Modellino of Organic Pollutants*, edited by Stephen Hern et al., Lewis Publishers, Inc., Misc., Chapter 9 (1986), and include: (1) pH, (2) temperature, (3) water content, (4) carbon content, (5) clay content, (6) oxygen, (7) nutrients, (8) the nature of the microbial population, (9) acclamation and (10) concentration.

A number of investigators have reported successful application of the in situ biodegradation process to treatment contaminated soils and have concluded that it is often cost effective and reduces site disruption. Some important limitations have also been identified, such as reaction kinetics, low substrate concentration and slow degradability of certain compounds.

R. Wetzel et al. in "Demonstration of In Situ Biological Degradation of Contaminated Ground Water and Soils", Sixth National Conference on Management of Uncontrolled Hazardous Waste Sites, Washington, D.C. (1985) describe a demonstration at Kelly Air Force Base, Texas, to treat contaminants consisting of hydrocarbons, aromatics and halogenated organics. A major limiting factor of the remediation cited therein is the low permeability of the fine-grained soil layers present at the site.

Further, V. Jhaveri et al. describe in "Bioreclammation of Ground and Ground Water by In Situ Biodegradation" Case History, Sixth National Conference on Management of Uncontrolled Hazardous Wast Sites, Washington, D.C. (1985) report the bioreclammation of a site in New Jersey contaminated with methylene chloride, n-butyl alcohol, acetone and dimethylaniline. After three years of in situ aerobic biological treatment, the contaminant plume was reduced 90%.

Still further, P. Yaniga et al. in "Aquifer Restoration Via Accelerated In Situ Biodegradation of Organic Contaminants", Seventh National Conference on Management of Uncontrolled Hazardous Waste Sites, Washington, D.C. (1986), in describing the reclamation of an aquifer contaminated with benzene, toluene, and xylene using biodegradation, emphasize the importance of oxygenating the subsurface environment. It is reported therein that superior rates of biodegradation using hydrogen peroxide as an oxygen donor result in comparison with a more traditional technique of air sparging.

In the method of thermal treatment or thermal soil decontamination, a contaminated soil is heated to a temperature of 400° C. to 700° C., which is sufficient to evaporate or pyrolize the organic contaminants. The gaseous products are then removed by convection. After dust removal from the gas stream, the organic products are completely destroyed in an after burner at temperatures as high as 1200° C. Consequently, the residual soil is ready for reuse after reconditioning, such as remoisturing. However, this method is in general unsuited for the removal of inorganic contaminants because of low volatility. Further, some inorganic compounds such as complexed cyanides and the more volatile metals such as mercury will decompose to gaseous products or evaporate partially under these conditions.

Thermal soil decontamination methods may be divided into two categories, namely rotary kiln fired decontamination and in situ decontamination. In the rotary kiln method, the required heat is transferred by direct or indirect firing of the soil. The fluidized bed technique is generally employed in direct heating, whereas infrared radiation on a conveyor belt or using hot oil in an extruder type reactor has been used for indirect heating. The in situ method applies radio frequency techniques. A system of electrodes is implanted into the ground to heat the soil to a predetermined temperature to vaporize the contaminants which are then vented by convection.

Another thermal treatment system is the thermal desorption-UV photolysis process described by S. G. DeCicco in "Transportable Hybrid Thermal Treatment System", 24th AIChE/ASME National Heat Transfer Conference, Pittsburgh, Pa., pages 407–412 (1987).

In general, the in situ approach is less expensive than the rotary kiln method, but the latter has proved more effective since the kiln agitation reduces the amount of contaminant trapped in the soil pores.

Paramount among the limitations of the above existing and emerging treatment technologies is the permeability of the soil formation being treated. The efficiency of the aforementioned in situ treatment processes all decrease as the soil permeability decreases. For soils with low permeabilities the existing processes are largely ineffective. Low soil permeability may be caused by a number of factors, including high clay content, high soil density and high fluid viscosity. Therefore, the effectiveness of many in situ treatment processes can be enhanced by increasing the permeability of the soil formation.

Unrelated to the removal of hazardous and industrial waste, it is also known to provide hydraulic fracturing in the petroleum industry to enhance well production. See, for example, the book *Hydraulic Fracturing* by G. C. Howard et al., Millet the Printer, Dallas, Tex., 1970. This is also related to pressure grouting procedures used to increase soil strength and decrease permeability around various engineering works, such as dam foundations and tunnels, which also uses water or other liquid agents.

In hydraulic fracturing, a section of an oil well is sealed off with pressure packers, and water is then injected until the pressure is sufficient to initiate fracture of the surrounding rocks. Once a crack is formed in the rocks, it will continue to propagate as long as the water pressure is greater than the stress normal to the plane of fracture. However, this process has only been used for fracturing rocks.

The theory describing hydraulic fracturing was first set out by M. King Hubbert in "Mechanics of Hydraulic Fracturing" in Trans. Am. Inst. Min. Engrs., Volume 210, pages 153–168 (1957) in which various modes of failure are discussed. Advances have also been made by the subsequent investigators, such as R. O. Kehle in "The Determination of Tectonic Stresses Through Analysis of Hydraulic Well Fracturing", J. Geophys. Res., Volume 69, pages 259–273 (1964) and P. L. Bertrand in "Note Seur L'Equilbre Elastigue D'Un Milieu Indefini Perce D'Une Cavite Cylidnrique Sous Pression", Annls. Ponts. Chauss., Volume 134, pages 473–522 (1964), who employs a stress concentration concept to analyze fracture conditions.

U.S. Pat. No. 5,032,042 issued to Schuring et al. on Jul. 16, 1991, and incorporated by reference herein in its entirety, discloses a method and apparatus for pneumatic fracturing. U.S. Pat. No. 5,560,737 issued to J. Schuring et al. on Oct. 1, 1996, and incorporated herein in its entirety, discloses a method and apparatus for pneumatically fracturing and multicomponent injection enhancement of in situ bioremediation.

Ultrasound technology has been proven in a variety of industrial applications to increase mass transfer rates in liquid phase and in vapor phase reactors.

Ultrasonic vibrations, or more accurately acoustical energy, appear as high frequency sound waves (20,000 to $10^9$ cps). In a fluid medium, ultrasonic energy in wave form may be used to form and collapse the cavities in a cyclic nature. This cycling may be used to create what is known as cavity (or bubble) resonant size. When the cavities reach resonant size, the collapse of the cavities occurs at such a rate that high local pressures of about 20,000 atmospheres and temperatures of about 10,000 Kelvin may be attained.

Both frequency and sound intensity are important characteristics of ultrasonic energy. For sonochemical reactions, frequencies are typically in the range of 20,000–50,000 cps and intensities in the range of 1–10 watts per $Cm^2$. Enhancement rates over 100 percent have been observed.

At least one source has suggested that a siren should be used to generate ultrasonic power in the range of several hundred watts. An ultrasonic siren is based on the principal of a gaseous jet being periodically interrupted by a rotating device and hence the pressure variation in the medium will propagate similar to sound waves. Allen and Rudnick [Allen C. and Rudnick, L., "A Powerful High Frequency Siren", J. of Acoustical Society of America, 19 No.5, pp. 857–865, September 1947] designed a siren based upon this principal. They reported that for the 6 inch diameter rotor with 100 equally spaced slots, corresponding to 100 equally spaced slots in the stator, at a rotor speed of 300 RPS, a 30 kHz ultrasonic signal was generated with a power output of 200 watts. The air pressure in the chamber was 0.2 Atm. The authors further stated that if the pressure is increased to 2 Atm an output of 2 kW were observed at 20 percent efficiency.

Meyer and Neumann [Meyer, E. and Neuman, E. G., "Physical and Applied Acoustics; An Introduction", p393, Academic Press, New York and London, 1972] discuss the wave form of the ultrasonic output from a siren and reported acoustic power of 20–50 kW when the air pressure is of the order of magnitude of atmospheres and the air flow rate is cubic meter per second.

Accordingly, it is an object of the present invention to provide a method and apparatus for eliminating subsurface contaminants that overcomes the aforementioned problems with the prior art.

It is another object of the present invention to provide a method and apparatus for eliminating subsurface contaminants more rapidly.

It is still another object of the present invention to provide a method and apparatus for eliminating subsurface contaminants that promotes the introduction of interstices into the subsurface.

It is a further object of the present invention to provide a method and apparatus for eliminating subsurface contaminants in which the water content of the body can be reduced to enhance biodegradation.

It is still further object of the present invention to provide a method and apparatus for eliminating subsurface contaminants that is relatively easy and economical to manufacture and use.

Another object of the invention is to provide a method and means for enhancing the in situ removal of at least one contaminant from a contaminated body.

Still another object is to provide a method and means for enhancing the in situ removal of at least one contaminant from a contaminated body by providing enhancement of emerging clean-up technologies.

It is a further object of the present invention to provide a means and method of using sonic/ultrasonic energy as an enhancing technique for in situ remediation of organic contaminants. It is a still further object of the present invention to couple the generation of ultrasonic waves with soil fracturing techniques to desorb contaminants from low permeability formations. It is another object of the present invention to provide a means and method of ultrasonically enhancing soil fracturing technologies for in situ detoxification of contaminated soil. It is yet another object of the present invention to compliment or enhance existing fracturing technologies.

It is still another object of the present invention to provide faster environmental clean-ups. It is another object of the present invention to increase the ability to reach regulatory clean-up levels, particularly at sites where contaminants are difficult to remove. It is another object of the present invention to provide a means and method of in situ contaminant removal which is simple and economical. It is a further object of the present invention to provide a means and method of soil remediation which offers an alternative to ex situ remediation processes, such as soil incineration. It is yet another object of the present invention to provide a method and means of in situ removal of volatile organic compounds. It still another object of the present invention to provide a means and method for removing contaminants which exist in solid, liquid, gaseous, or gel form, or some combination thereof.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing a method and means for enhancing the in situ removal of at least one contaminant from a contaminated body.

In one aspect, the present invention concerns a contaminant removal means for enhancing the in situ removal of at least one contaminant from a contaminated body, the body being provided with at least one interstice, by generating and focusing vibrations toward the interstice, thereby exciting the contaminant within the body, whereby transport of the contaminant out of the body is facilitated. Preferably, the vibrations are sonic/ultrasonic vibrations. The body may be a geologic formation, which may have at least one porous portion, and/or which may be at least partially saturated with a liquid.

The contaminant removal means may further comprise means for forcing a gas into the interstice. The contaminant removal means may also further comprise a vacuum extraction means. The contaminant removal means may yet further comprise a transformation means, which in particular embodiments may comprise a biodegradation means or thermal treatment means.

Preferably, the contaminant removal means further comprises an ultrasonic siren or an ultrasonic whistle.

In another embodiment, the present invention comprises an apparatus for introducing vibratory sound energy into at least one discrete zone in a geologic formation, the geologic formation being provided with at least one borehole. The apparatus preferably comprises at least one head for generating vibratory sound energy, the head being adapted to fit within the borehole, and placement means for placing the head in the borehole at a desired depth, wherein the head is capable of being placed in proximity with the discrete zone, whereby the apparatus is capable of generating and focusing vibratory sound energy in the vicinity of the discrete zone. The head preferably generates sonic or ultrasonic vibrations. The head may also direct the vibratory sound energy in a direction generally transverse to the direction of the borehole. Preferably, the head comprises an ultrasonic siren or ultrasonic whistle. The placement means may comprise supply means for supplying the head with energy.

In another embodiment, the present invention comprises an apparatus, for use with a pressurized gas source, for enhancing the in situ removal of at least one contaminant from a contaminated body, the body being provided with at least one borehole. The apparatus comprises at least one head adapted to fit within the borehole and means for supplying pressurized gas to the head from the gas source. The head comprises means for generating and emitting vibratory sound energy and means for pneumatically fracturing at least a portion of the body. The apparatus is capable of simultaneously creating at least one interstice in the body and directing vibrations toward the interstice, thereby exciting the contaminant contained within the body, whereby transport of the contaminant out of the body is facilitated. The apparatus may also comprise means for transforming the contaminant into a different state.

In another aspect, the present invention concerns a method for enhancing the in situ removal of at least one contaminant from a contaminated body, the method comprising exciting the contaminant within the body with vibratory sound energy.

In another embodiment, the present invention comprises a method for enhancing the in situ removal of at least one contaminant from a contaminated body, the body being provided with at least one interstice, the method comprising directing sonic vibrations toward the interstice.

In yet another embodiment, the present invention comprises a method for enhancing the removal of at least one contaminant from a contaminated geologic formation, the method comprising introducing vibratory sound energy into at least one discrete zone in the geologic formation. The geologic formation may be provided with at least one interstice, and the vibratory sound energy is preferably directed toward the interstice. The geologic formation may also be provided with at least one borehole, wherein the vibratory sound energy is preferably generated within the borehole. Preferably, the vibratory sound energy is directed generally transversely to the direction of the borehole. The method may further comprise fracturing at least a part of the geologic formation. Preferably, the vibrations are sonic or ultrasonic.

The method may further comprise simultaneously inducing at least one fracture in the body, or forcing a gas into the interstice, or applying vacuum extraction to the body, or transforming the contaminant, or some combination thereof.

In another embodiment, the present invention comprises a method for introducing vibratory sound energy into at least one discrete zone in a geologic formation with a probe, the geologic formation being provided with at least one borehole, wherein the probe is adapted to fit within the borehole, wherein the method comprises placing the head in the borehole at a desired depth and generating vibratory sound energy in the probe and directing the sound energy toward the discrete zone. Preferably, the head directs the vibratory sound energy in a direction generally transverse to the direction of the borehole.

In yet another embodiment, the present invention comprises a method for enhancing the in situ removal of at least one contaminant from a contaminated body with a probe head, the body being provided with at least one borehole, the probe being adapted to fit within the borehole, the method comprising placing the head in the borehole, providing pressurized gas to the head, and pneumatically generating vibratory sound energy in the head from at least a portion of the pressurized gas and emitting the energy from the head into the body. The method may further comprise pneumatically fracturing at least a portion of the body with at least a portion of the pressurized gas. Furthermore, the method may further comprise simultaneously creating at least one interstice in the body and directing the vibratory sound energy toward the interstice, thereby exciting the contaminant contained within the body, whereby transport of the contaminant out of the body is facilitated.

BRIEF DESCRIPTION OF THE DRAWINGS

Understanding of the present invention and the various aspects thereof will be facilitated by reference to the accompanying drawing figures, submitted for purposes of illustration only and not intended to define the scope of the invention, on which:

FIG. 2 is a schematic representation of a cutaway view of an ultrasonic whistle according to the present invention.

FIG. 3 is a side elevational partially cutaway view of a preferred embodiment of a pneumatically driven ultrasonic whistle according to the present invention.

FIG. 4 is a top view of the ultrasonic siren of FIG. 3.

DETAILED DESCRIPTION OF THE PREFERRED EMBODIMENTS

Figure 1:
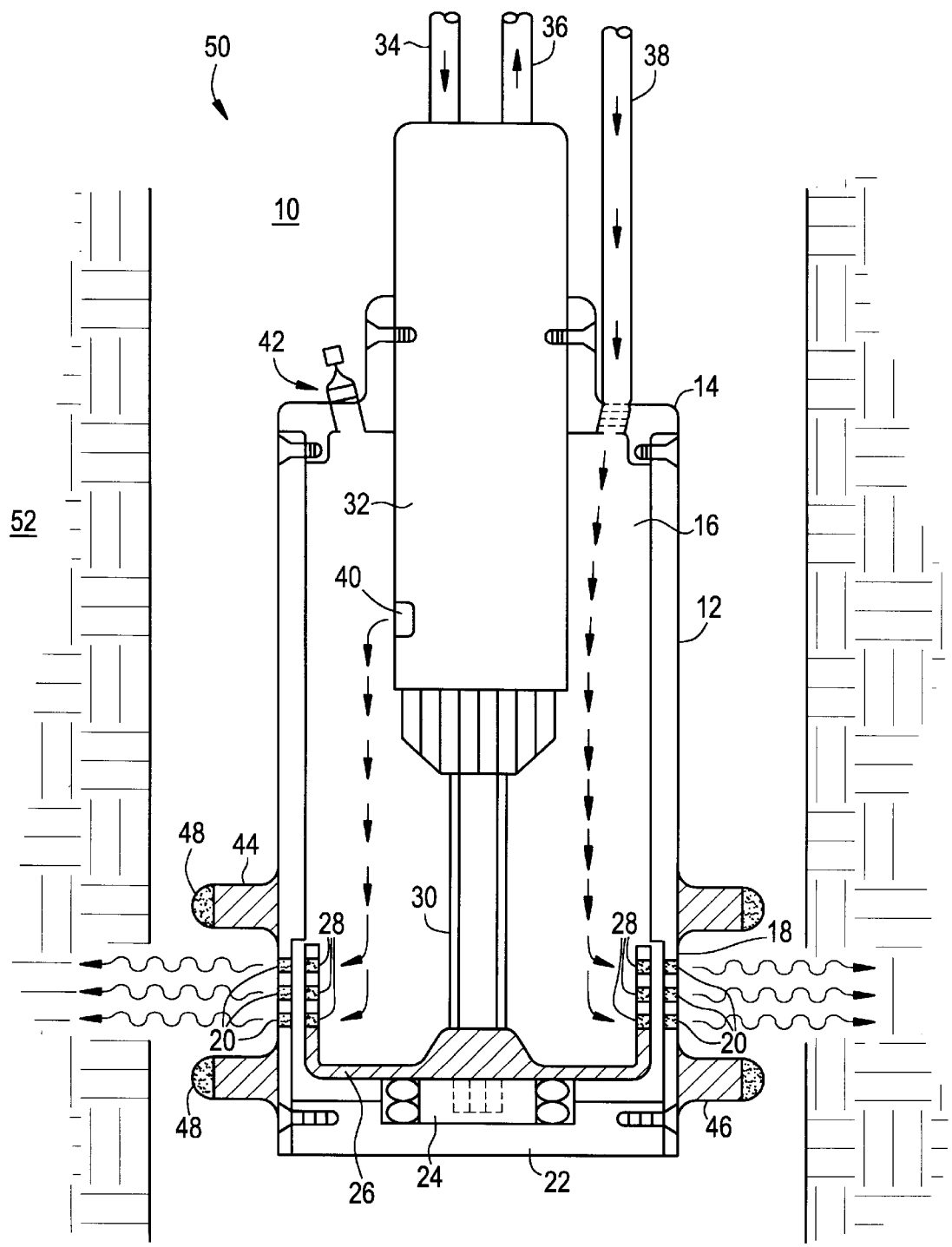
FIG. 1 is a side elevational partially cutaway view of a preferred embodiment of a pneumatically driven ultrasonic siren according to the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may also be seen on other views.

The present invention concerns a method and means for enhancing the removal of at least one contaminant from a contaminated body in situ, the body being provided with at least interstice, by generating and focusing vibrations toward the interstice, thereby exciting the contaminant within the body, whereby transport of the contaminant out of the body is facilitated. Preferably, the vibrations are sonic or ultrasonic vibrations. The contaminant may at least partially occupy the body in liquid, gaseous, gelled, or solid form, or some combination thereof. For example, the body may contain at least one gas which occupies at least part of at least one interstice, or the body may be at least partially saturated with one or more liquids. Thus, the ultrasonic/sonic vibrational energy may enhance the removal of contaminants which exist in vapor, liquid, gel or a solid phase.

As used herein the term "interstice" is intended to generally include any type of pore, crack, fissure, void, separation, air pocket, space, coarse-grained lens, vug, dissolution slot, or some combination thereof. The interstices may be naturally occurring, or may be artificially induced by pneumatic fracture injections, blasting, land filling, or other means.

In a particularly preferred embodiment of the present invention, sonic/ultrasonic energy is directed toward and focused at a discrete zone in a contaminated body wherein the zone has at least one interstice, or in which zone at least one interstice is simultaneously formed with the application of the sonic/ultrasonic energy.

By way of another example, in treating geologic formations that are afflicted with a contaminant, the contaminants may be "residual" compounds which exist in a liquid phase within a partially saturated geologic formation. In particular, contaminants may exist in a vapor phase when a vapor halo develops around a subsurface plume of volatile organic compounds (VOCs). Such halos have been observed around plumes of chlorinated solvents of trichloroethylene (TCE).

By way of further example, solid phase contaminants whose removal can be enhanced by the present invention may include VOCs which have assumed a crystalline form, for example, the crystalline form of petroleum hydrocarbons which remain underground for many years. The enhancing mechanism for the vapor and solid phase removal is similar to that for the liquid phase, i.e., molecular excitation by ultrasonic/sonic energy leading to desorption and volatilization.

Most preferably, the vibrations created by the present invention are based upon sound energy vibrations, i.e., sonic or ultrasonic vibrations, although other sound based vibrations of other frequencies are also contemplated. Depending upon the characteristics of the body and its contamination, a desired frequency or range of frequencies may be utilized in order to effectively enhance contaminant removal. For example in geologic formations, the optimum frequency will depend on site geology as well as well as the physiochemical characteristics of the contaminant.

As used herein, the term "sound" includes the frequency range corresponding to those waves discernable to the human ear, i.e. about 20 to 20,000 Hz, as well as for similar waves with frequencies outside the range of human hearing. University Physics, 7th edition, Sears et al., Addison-Wesley Publishing Company, Reading, Mass., 1986. At the high end of the threshold of audibility for humans is the frequency range commonly referred to as ultrasonic. Some sources define ultrasonic frequencies as ranging from 20 kHz to 500 MHz, although this range is approximate and varies somewhat among the references. Ultrasonics, Arthur P. Cracknell, Wykeham Publications, London, 1980; Ultrasonic Engineering, Alan E. Crawford, Butterworths Scientific Publications, London, 1955.

Most preferably, the present invention is used in combination with a transformation means to remove or treat the contaminants in the body or in the subsurface. For example, the ultrasonic/sonic enhancement may be integrated with vapor extraction or dual phase extraction which typically involves simultaneous extraction of liquid and gas. Other in situ remediation processes which can benefit from the sonic/ultrasonic enhancement provided by the present invention include air sparging, biostimulation, bioaugmentation, and soil flushing.

The contaminated body may comprise a geologic formation, which may include one or more types of soil, rock, clay, bedrock, glacial fills, over consolidated clays, gravel, sand, karstic carbonate rocks or other geologic material.

The body may be homogeneous or heterogeneous, and preferably includes at least one interstice. The body may be naturally fractured or artificially fractured, such as by blasting or pneumatic fracturing.

By way of further example, the body may comprise a landfill, which is typically heterogeneous.

As an example of one application, the present invention may be particularly useful in enhancing removal of VOCs and liquid contaminants from moderate to low permeability geological formations.

The present invention may also be used in conjunction with a vacuum extraction means or a transformation means such as biodegradation or thermal treatment. For example, the ultrasonic/sonic vibrations may be transmitted in situ into a geologic formation in a forced flowfield of gas, i.e. where a gas is forced into an interstice in the geologic formation. The gas stream would simultaneously strip the volatilized contaminant and deliver it to the transformation means. Furthermore, the present invention could promote transmission of ultrasonic/sonic energy in the form of a standing wave in stationary gas. In such applications, the transformation means could be applied cyclically to treat or remove the contaminants mobilized by the ultrasound or sound waves.

A particularly preferred embodiment, for use with a variety of types of bodies and contaminants comprises the application of ultrasonic energy to the body after vacuum extraction of the body has yielded asymptotic results, e.g. a diminishing return is reached on the contaminant removal based on vacuum extraction. Thereafter, ultrasonic/sonic energy is applied to the contaminated body, preferably simultaneously with vacuum extraction, in order to remove any residual contamination. Thus, the application of sonic/ultrasonic energy further complements fracturing of the contaminated body, wherein the sonic energy may serve to "polish off" difficult to remove or difficult to reach contaminants. The combination of sonic/ultrasonic energy and fracturing thus should yield both faster clean-ups and more thorough clean-ups. The present invention thus may enhance the ability to reach regulatory clean-up levels at difficult sites.

Thus, the present invention may further comprise a coupling of the application of ultrasonic/sonic energy with pneumatic fracturing, either serially, alternately, or simultaneously. The application of sonic/ultrasonic energy further tends to enhance the fracturing process, for example by enhancing the propagation of fracture tips due to pressurization, pressure waves, and/or establishment of resonance within an interstice and/or the boundary of the interstice. Thus, the sound based energy may be applied to the contaminated body before, during, or after pneumatic fracturing injections.

Preferably, ultrasonic vibrations may be produced by an ultrasonic transducer such as an ultrasonic siren or an ultrasonic whistle, and the siren or whistle is preferably pneumatically driven. In addition, the present invention also contemplates a liquid driven sonic/ultrasonic transducer. In one particular embodiment, a liquid whistle or siren may be supplied with a flow of water, aqueous solution, or other liquid. The liquid may contain chemical or biological reactants, reagents, catalysts, microbes, or other substances for reacting with or operating upon or transforming one or more contaminants in situ. For example, injection of aqueous chemical agents through a liquid whistle will induce cavitations, thereby enhancing the reaction rate of the chemical agents with the contaminant.

In another embodiment, the present invention concerns an apparatus for introducing in situ vibratory sound energy into at least one discrete zone in a geologic formation, wherein the geologic formation is provided with at least one bore hole. The apparatus includes at least one head for generating vibratory sound energy, preferably ultrasonic. The head is adapted to fit within the bore hole. The head is attached to a placement means for placing the head in the bore hole at a desired depth. Thus, the head is capable of being placed in proximity with the discrete zone. The apparatus is capable of generating and focusing vibratory sound energy in the vicinity of the discrete zone. Preferably the head directs the vibratory sound energy in a direction generally transverse to the direction of the bore hole, and the ultrasonic vibrations are preferably produced pneumatically by an ultrasonic siren or whistle. The placement means may include a supply means for supplying the head with energy such as that provided by at least one compressed air supply line. Thus, the ultrasonic transducer may be pneumatically, or air-driven, and supplied with compressed air by the supply line. A compressed gas other than air may also be used to drive the ultrasonic transducer.

In yet another embodiment, the present invention concerns an apparatus, for use with a pressurized gas source, for enhancing the in situ removal of at least one contaminant from a contaminated body, the body being provided with at least one bore hole. The apparatus includes at least one head adapted to fit within the bore hole, and means for supplying pressurized gas to the head from the gas source. The head includes means for generating and emitting vibratory sound energy, and means for pneumatically fracturing at least a portion of the body. Thus, the apparatus may simultaneously create at least one interstice in the body and focuses vibrations toward the interstice. Preferably, a contaminant contained within the body is excited, and transport of the contaminant out of the body is facilitated. Alternately another substance within the body may be energized or stimulated by the sound energy propagation, which energization may cause the substance to move or transform, which in turn enhances the transformation or removal of one or more contaminants in the body. Preferably the means for generating and emitting vibratory sound energy is pneumatically driven by a pressurized gas source. Further preferably, the vibratory sound energy is directed generally transversely to the direction of the bore hole. The apparatus may further comprise means for transforming the contaminant into a different state, such as by heating, chemical reaction, or microbiological activity. Thus, the apparatus may include a microbial introduction means for transforming the contaminant.

The present invention also concerns a method for enhancing the in situ removal of at least one contaminant from a contaminated body, the method comprising exciting the contaminant within the body with vibratory sound energy.

In another embodiment, the present invention relates to a method for enhancing the in situ provided with at least one interstice, the method comprising directing sonic vibrations toward the interstice.

In yet another embodiment, the present invention concerns a method for enhancing the in situ removal of at least one contaminant from a contaminated geologic formation, the method comprising introducing vibratory sound energy into at least one discrete zone in the geologic formation. The geologic formation is preferably provided with at least one interstice, and the vibratory sound energy is directed toward interstice. Thus, vibrations are focused upon the contaminant which occupies, or is adjacent to, the interstice. Preferably the geologic formation is provided with at least one bore hole, and the vibratory sound energy is generated within that bore hole. Further preferably, the vibratory sound energy is directed generally transversely to the direction of the bore hole. The method may also comprise fracturing at least a part of the geologic formation.

In yet another embodiment, the present invention relates to a method for enhancing the in situ removal of at least one contaminant from a contaminated body, the body being provided with at least one interstice, comprising focusing vibrations toward the interstice, thereby exciting the contaminant within the body, whereby transport of the contaminant out of the body is facilitated. The method may further comprise pneumatically generating the vibrations, wherein the vibrations are sonic or ultrasonic vibrations. The method may also comprise inducing at least one fracture in the body, preferably by pneumatic fracturing, either before or during focusing vibrations toward the interstice. Thus, the method may comprise simultaneously inducing at least one fracture in the body and emitting sound energy into the body. The method may further comprise forcing a gas, such as compressed air, into a fracture or interstice in the body. The method may also comprise drawing a vacuum on at least part of the body in order to facilitate extraction or removal of one or more contaminants from the body. The contaminants may then be collected or transported away from the body. The contaminant or contaminants may also be transformed while occupying the body. For example, a contaminant may be transformed by biodegradation or thermal treatment.

In still another embodiment, the present invention concerns a method for the in situ introduction of vibratory sound energy into at least one discrete zone in a geologic formation with a probe, the geologic formation being provided with at least one bore hole, wherein the probe is adapted to fit within the bore hole. The method comprises placing the head in the bore hole at a desired depth, and generating vibratory sound energy in the probe and directing the sound energy toward the discrete zone. Preferably the head directs the vibratory sound energy in a direction generally transverse to the direction of the bore hole. Further preferably, the head generates ultrasonic vibrations, either pneumatically or by other means.

In one embodiment, a bore hole is drilled into the geologic formation, a device is inserted into the bore hole, and at least part of the geologic formation, preferably adjacent the bore hole, is fractured. The fracturing device is then removed from the bore hole, and a sonic probe is inserted therewith, down to a desired depth. The probe is activated so as to generate and emit ultrasonic vibrations in the vicinity of the fractured area. The probe head may then be raised or lowered within the bore hole in order to direct and focus the sonic energy emanating from the probe head into, or onto, discrete zones in the geologic formation which preferably include a fracture. Preferably, the sonic energy is applied in situ while the probe is being raised or lowered within the bore hole, although the probe may be deactivated during translation of the probe head. Sonic vibrations may be generated continuously or intermittently, whether or not the probe head is being raised or lowered or remains stationary within the bore hole.

In still another embodiment, the present invention relates to a method for enhancing the in situ removal of at least one contaminant from a contaminated body with a probe head, the body being provided with at least bore hole, and the probe being adapted to fit within the bore hole. The method comprises placing the head in the bore hole, providing pressurized gas to the head, and pneumatically generating vibratory sound energy in the head from at least a portion of the pressurized gas and emitting the energy from the head into the body. The method may further comprise pneumatically fracturing at least a portion of the body with at least a portion of the pressurized gas. The method may also comprise simultaneously creating at least one interstice in the body and directing the vibratory sound energy toward the interstice, thereby exciting the contaminant contained within the body, whereby transporting the contaminant out of the body it is facilitated. The method may also comprise focusing the vibratory sound energy generally transversely to the direction of the bore hole. The probe head may be provided with a pressurized gas diverting means, wherein the pressurized gas which enters the probe head is apportioned between a pneumatically driven sonic transducer and a means for pneumatically fracturing so that the sonic transducer and the fracturing means may be operated simultaneously. The probe head may further comprise means for selectively diverting all of the pressurized gas which enters the probe head into either the fracturing means or the sonic propagation means.

The probe may further comprise one or more packers or engagement means or bore hole sealing means for selectively engaging the walls of the bore hole for sealing the probe within the bore hole. Thus, the packers may tightly engage the walls of the bore hole or well, thereby holding the probe head in position and concentrating the propagation of sonic energy and/or compressed air into a discrete zone within the body, thereby further preventing wasteful discharge thereof above and/or below the probe head. Thus, the energy delivered by the probe head is focused in situ onto a desired discrete zone while minimizing unproductive dissipation into the remainder of the bore hole.

In another embodiment, the present invention comprises an apparatus for introducing ultrasonic/sonic energy in situ into a contaminated body to enhance the in situ removal of at least one contaminant from the body wherein the apparatus comprises an ultrasonic/sonic transducer which is injected with, or supplied with, a forced liquid flow that drives or powers the transducer. Preferably, the liquid is adapted to react with one or more of the contaminants in the body. For example, the operating liquid of the transducer may comprise an aqueous chemical agent which reacts with or catalyzes the contaminant in the body. The injection of the liquid and/or chemical agent through the transducer preferably causes cavitation in the liquid, thereby enhancing the reaction rate of the chemical agents with the ground contaminants, whereby the contaminants are eliminated from the body at enhanced rates. For example, this embodiment may be used in a pump and treatment system for treating ground water wherein the liquid which is pumped through the transducer and focused toward the ground contains chemical agents capable of reacting with contaminants. Liquid may be pumped into the ground through the transducer at a regulated pressure. The transducer, which preferably is an ultrasonic whistle, will create ultrasonic vibration which will, in turn, cause cavitation, whereby the cavitation phenomenon will tend to increase the reaction rate of any reaction that might take place in the ground or in the fractured formation. Thus, the present invention contemplates a method of enhancing in situ remediation by injecting a pressurized, ultrasonic stream of liquid into a geologic formation or other contaminated body.

FIG. 1 shows an elevational partial cutaway view of an ultrasonic probe comprising a downhole air driven ultrasonic siren according to one embodiment of the present invention. The ultrasonic probe 10 includes a tubular outer housing 12 and a top cap 14 which define an interior cavity 16 therein. The distal end 18 of the outer housing 12 is provided with at least one port 20, and preferably a plurality of circumferential ports, extending through to the outer surface of the outer housing 12. The probe 10 also comprises a bottom cap 22 which is preferably provided with a sealed bearing 24. A rotator 26 having at least one port 28 disposed therethrough is rotatably mounted within the interior cavity 16 on drive shaft 30 which is mounted on the sealed bearing 24. The rotator 26 is mounted upon the drive shaft 30 so as to enable the ports 28 on the rotator 26 to rotate past, and in proximity to, the ports 20 on the outer housing 12. The drive shaft 30 is driven by the motor 32. Preferably, the motor 32 is air driven and connected to a compressed air source by at least one air feed line 34 and at least one air feed exhaust 36. A supplemental compressed gas or air feed line 38 attaches to the top cap 14 to allow compressed gas or air to be supplied to the interior cavity 16, wherein the gas or air passes through the cavity 16 and out through the port 28 in the rotator 26, and thereafter out through the port 20 in the outer housing 12. The gas or air driven motor 32 may be optionally provided with a motor exhaust port 40 which permits compressed gas or air to be diverted from the motor 32 into the interior cavity 16 to supplement the flow of gas or air out of the ports 28, 30. The top cap 14 may also optionally include a supplemental inlet/exhaust balancing port 42 to further regulate the pressure and/or flow rate of gas or air in the interior cavity 16. The outer housing 12 further includes upper 44 and lower 46 deflector rings which are disposed on the outer wall of the outer housing 12 above and below the port 20, respectively.

In operation, the ultrasonic probe 10 is placed into a bore hole 50 in a contaminated body 52, such as a geologic formation. Upper and lower deflector rings 44, 46 help to protect the siren and other parts of the probe head 10 which is lowered into the bore hole 50. The device 10 is lowered into the bore hole 52 until the siren portion is proximate a discrete zone corresponding to the location of one or more interstices in the body 52. A compressed air source supplies compressed air, which preferably is regulated by a pressure and flow rate regulator, to the motor 32, which in turn drives the drive shaft 30, which rotates the rotator 26. The flow of air passing through the interior cavity 16 from the supplemental compressed air feed line 38 and/or the motor exhaust port 40 passes through the ports 28 disposed through the rotator 26 and the ports 20 in the outer housing 12 when the ports 20, 28 are alternately aligned. After the application of sonic or ultrasonic energy to the particular region of the discrete zone adjacent to the siren portion is completed, i.e. after an application of energy at a given pressure and flow rate for a given time, or after a schedule of pressures, temperatures, and times, the probe 10 may be raised or lowered to another position within the bore hole 50, and the process repeated. Air may be supplied to the transducer while the head 10 is being raised or lowered, or the compressed air supply may be temporarily halted.

In a particular embodiment, an ultrasonic siren was constructed which comprised an air motor encased in a 3 inch diameter pipe. The motor was attached to a rotator which was provided with equally spaced holes in circumferential rows of six. The holes were aligned with equally spaced holes in circumferential rows of six on the casing pipe or outer housing. In operation, air entered the interior cavity or chamber where the rotator was located and was forced out through the holes, primarily when the holes were aligned. Thus, during rotation of the rotator, the holes were alternately aligned and unaligned, thereby opening and closing the air pathways out of the siren, thereby creating the sound waves characterized by the number of holes in one of the rows radially multiplied by the angular velocity of motor shaft in revolutions per second. Operating characteristics of the siren are summarized in Table 1.

TABLE 1

| Siren Characteristics | | Operational Parameters | | | | |
| --- | --- | --- | --- | --- | --- | --- |
| Outer Diameter (Inches) | Number of Holes[1] | Motor Speed (RPS) | Freq. (Hz) | Inlet Air Pressure (PSIG) | Inlet Air Flow (CFM) | Sound Level (db) |
| 3.0 | 56 | 64 | 3,584 | 5 | 1.5 | 98 |
| 3.0 | 56 | 120 | 6,720 | 10 | 2.0 | 102 |
| 3.0 | 56 | 233 | 13,048 | 15 | 2.5 | 110 |
| 3.0 | 56 | 317 | 17,752 | 30 | 3.0 | 112 |
| 3.0 | 56 | 233 | 13,048 | 50 | 4.0 | 122 |
| 3.0 | 56 | 233 | 13,048 | 60 | 4.5 | 122 |
| 3.0 | 56 | 233 | 13,048 | 70 | 5.0 | 125 |
| 4.0 | 74 | 64 | 3,584 | 5 | — | — |
| 4.0 | 74 | 120 | 6,720 | 10 | — | — |
| 4.0 | 74 | 233 | 13,048 | 15 | — | — |
| 4.0 | 74 | 317 | 17,752 | 30 | — | — |
| 5.0 | 93 | 64 | 3,584 | 5 | — | — |
| 5.0 | 93 | 120 | 6,720 | 10 | — | — |
| 5.0 | 93 | 233 | 13,048 | 15 | — | — |
| 5.0 | 93 | 317 | 17,752 | 30 | — | — |

[1]Hole Diameter Constant at 8.415E-2 Inches

Referring again to FIG. 1, the peripheral edge of the deflector rings 44, 46 may be provided with a bumper or seal means 48. The bumper material may comprise a rubber or plastic or metal or other suitable material which provides protection for the device 10 from collisions with the walls of the well or bore hole 50 upon lowering or raising of the device 10.

Figure 2:
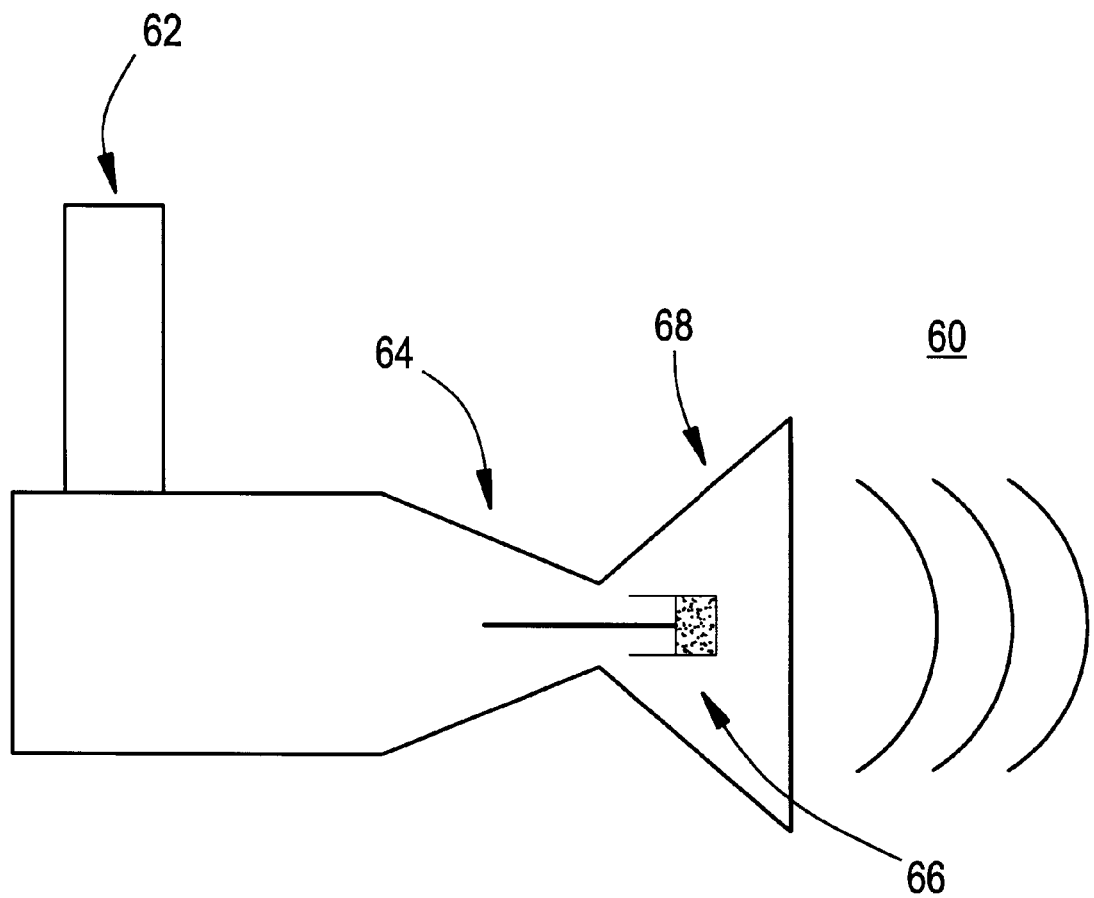
FIGS. 2–4 represent a preferred embodiment of an ultrasonic whistle according to the present invention.
Figure 3:
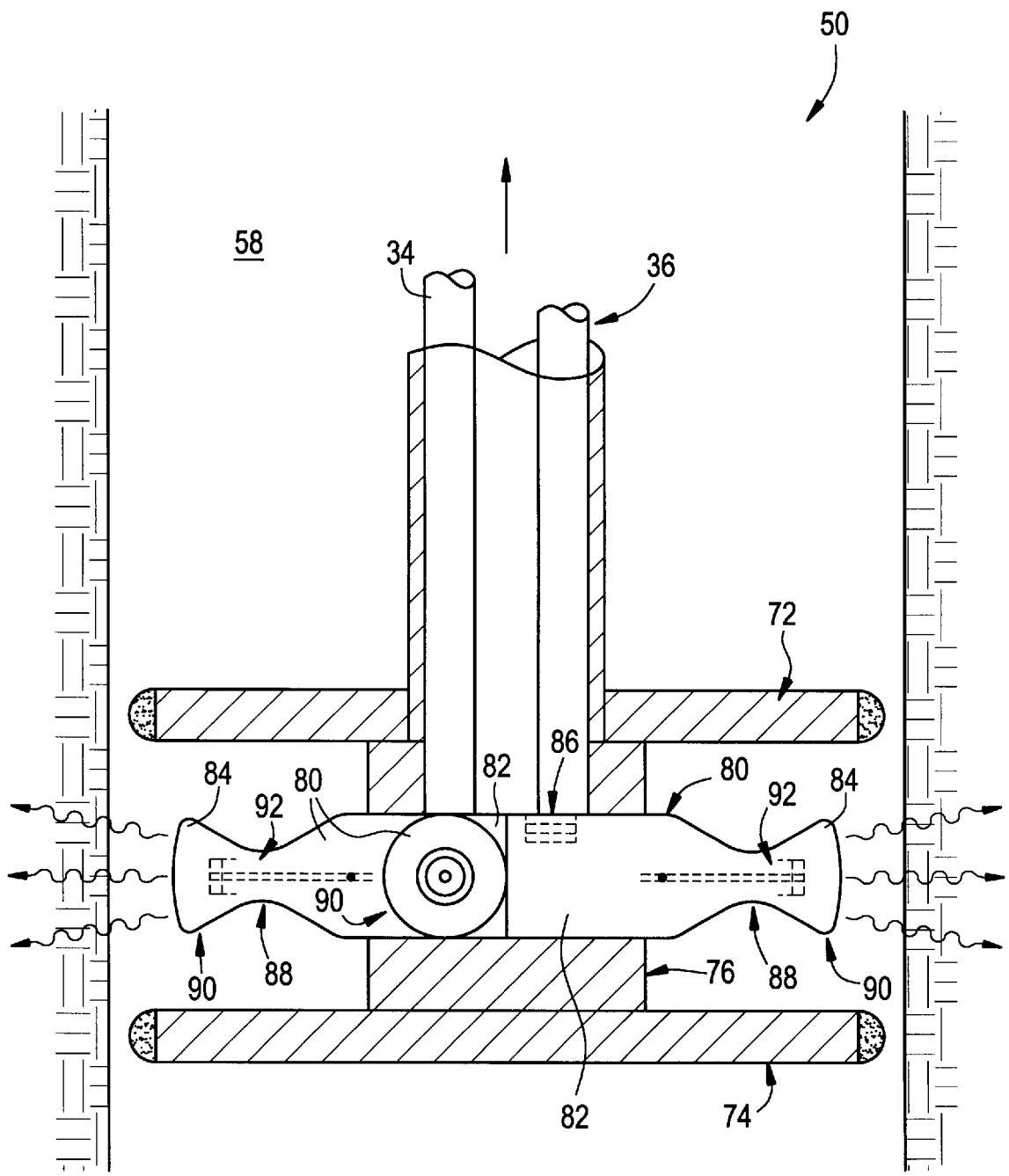
Figure 4:
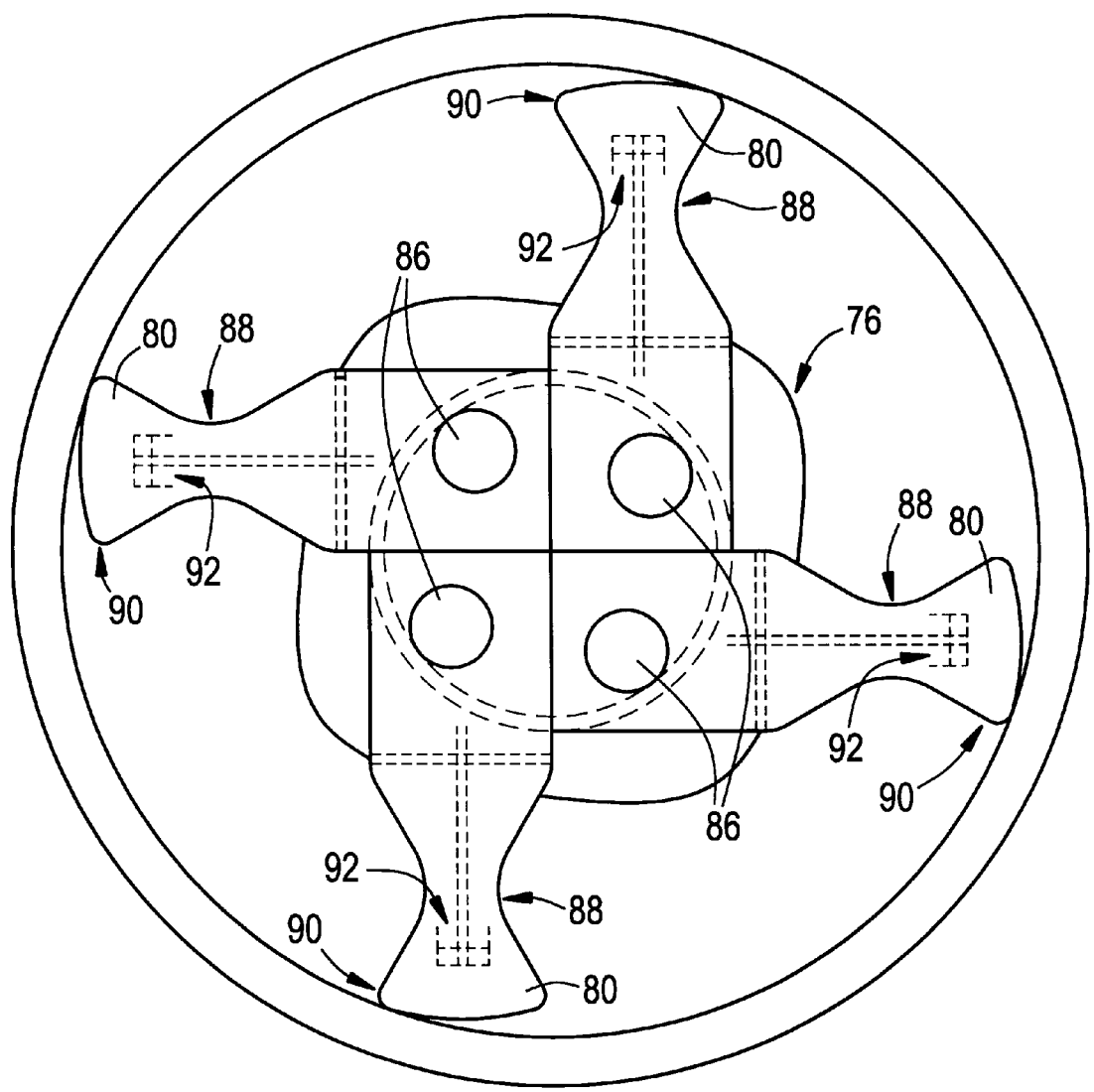

FIGS. 2–4 illustrate a particular embodiment of an ultrasonic whistle transducer 60 and a downhole multi-directional ultrasonic whistle probe 70 according to the present invention. As shown schematically in FIG. 2, the particular embodiment is an ultrasonic whistle 60 having an inlet gas opening 62, a tapered nozzle 64, a resonator cavity 66 and a conical horn 68. A particular whistle 60 was constructed and tested at an inlet air pressure of 30 psig and yielded an intensity of 160 db at a frequency of 11 kHz. Returning to FIGS. 3 and 4, a particular embodiment of an ultrasonic whistle probe 70 was constructed. The probe 70 comprises a top deflector 72, a bottom deflector 74, and a whistle clamp mount portion 76 fixably disposed therebetween. Four ultrasonic whistles 80 are mounted to the whistle clamp mount 76, although it should be noted that a single whistle 80, or another number of whistles, may be mounted to the whistle clamp mount 76, as desired. Furthermore, the ultrasonic whistles 80 shown in FIGS. 3–4 are mounted generally in a transverse plane, although the whistles may be mounted at more than one location along the longitudinal direction of the probe. Each whistle 80 comprises a proximal end 82 and a distal end 84, wherein the proximal end 82 is disposed near the center of the device. The proximal end 82 of each whistle 80 is provided with an air inlet opening 86. Each whistle 80 further comprises a tapered nozzle portion 88 and a conical horn 90, wherein the horn 90 defines a resonator cavity. A resonator 92 is disposed in the cavity and extends through the tapered nozzle portion 88. Thus, inlet air may be supplied to the whistle 80, and the air then travels through the tapered nozzle portion 88 past the resonator 92 and through the resonator cavity. Air is forced past the tapered nozzle section 88 and impinges upon the resonator cavity, thereby causing a variation of the air pressure in the vicinity of the cavity, preferably at ultrasonic frequencies. The resulting waves emanate from the whistles 80 and are directed outward from the device, generally transversely. The top and bottom deflectors 72, 74 protect the whistles 80 from contact with the walls of the bore hole 50 as well as from any foreign matter which may fall on top of the device 70 while disposed in the bore hole. The deflectors 72, 74 also serve to contain or focus the emanating sound waves by reflecting same and permitting the waves to travel circumferentially outward. One or more air feed lines 34, 36 connect the head to a source of pressurized gas or compressed air. A single air feed line may be used, with a multi-port adapter disposed in the head to allow distribution of the air to one or more of the whistles. Alternately, a plurality of pressurized gas lines may be connected to the head to allow independent supply of gas to each of the whistles.

Thus, the present invention focuses ultrasonic energy into discrete zones in a body such as a geologic formation so that the sonic energy can penetrate deeper into the geologic formation. Furthermore, the invention may be capable of pressurizing a fracture in the discrete geologic zone, thereby intensifying the sonic energy in the formation. As a result, a greater radius of influence and a higher degree of enhancement in the removal rate of contaminants such as volatile organic compounds in soil may be achieved.

It should be noted that the present invention encompasses other embodiments and other types of sonic/ultrasonic sirens or whistles.

Figure 5:
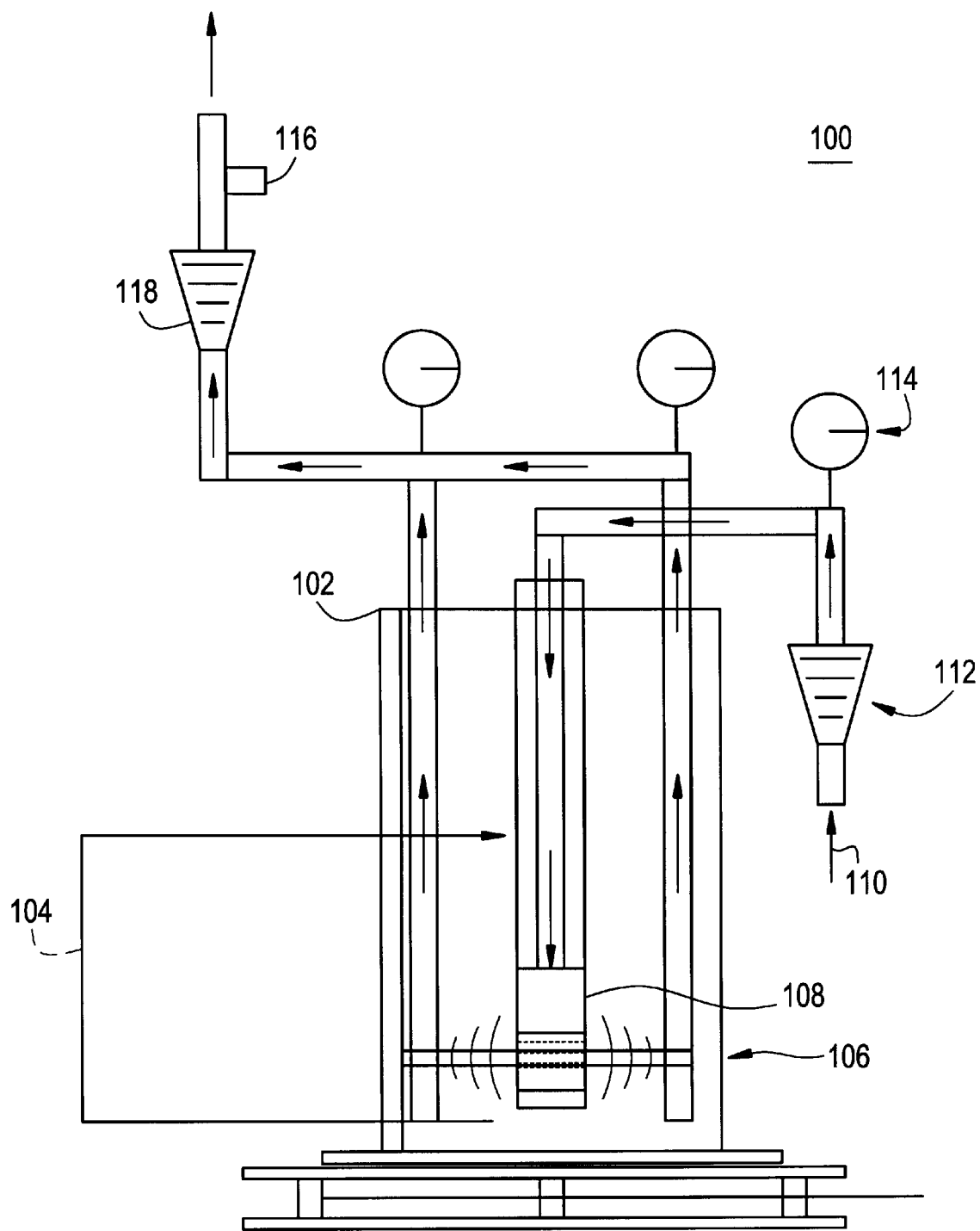
FIG. 5 is a schematic representation of a test set-up used to test preferred embodiments of an ultrasonic siren and whistle.
Figure 6:
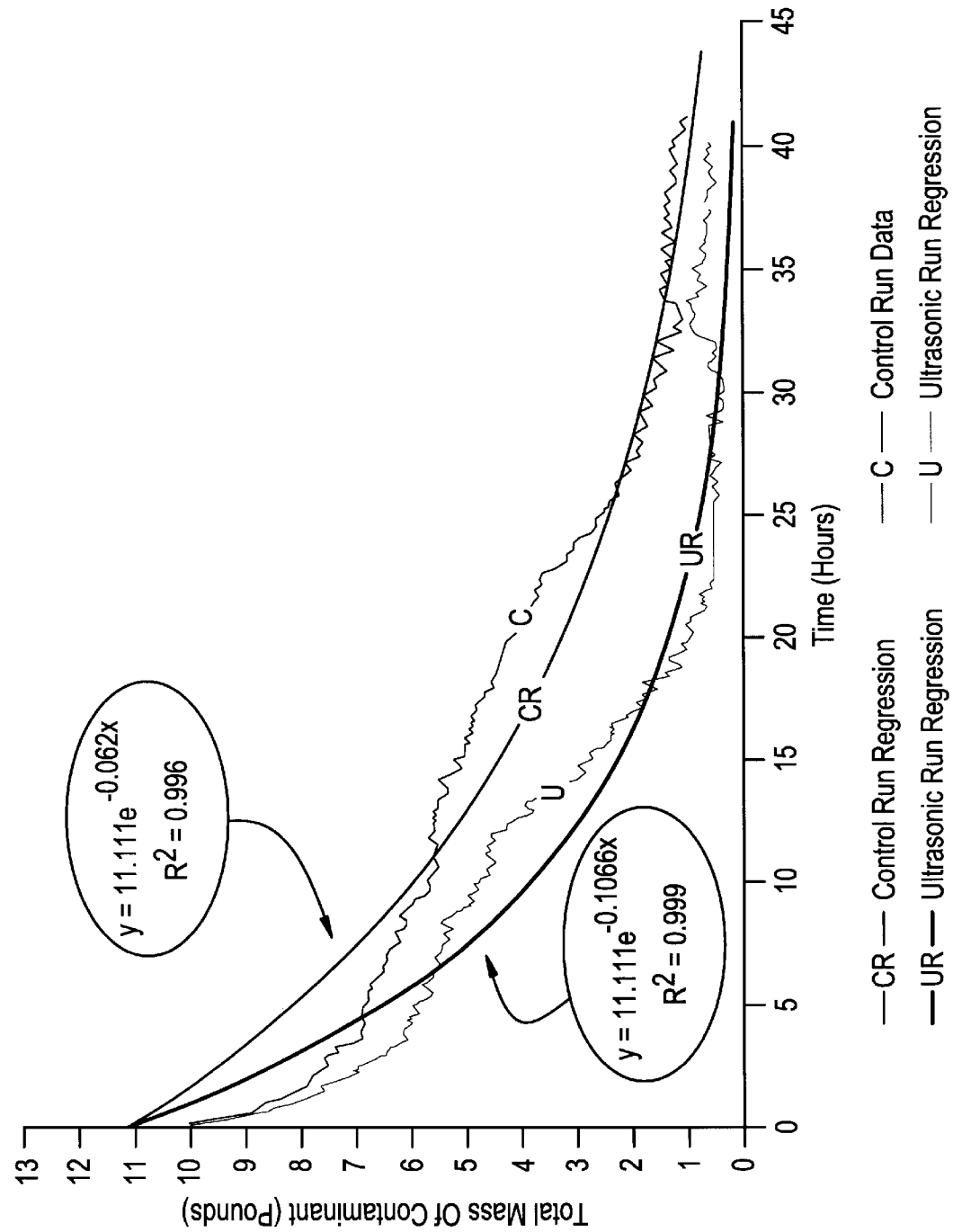
FIG. 6 is a graphical representation of the contaminant mass removal achieved by an ultrasonic siren according to the present invention.
Figure 7:
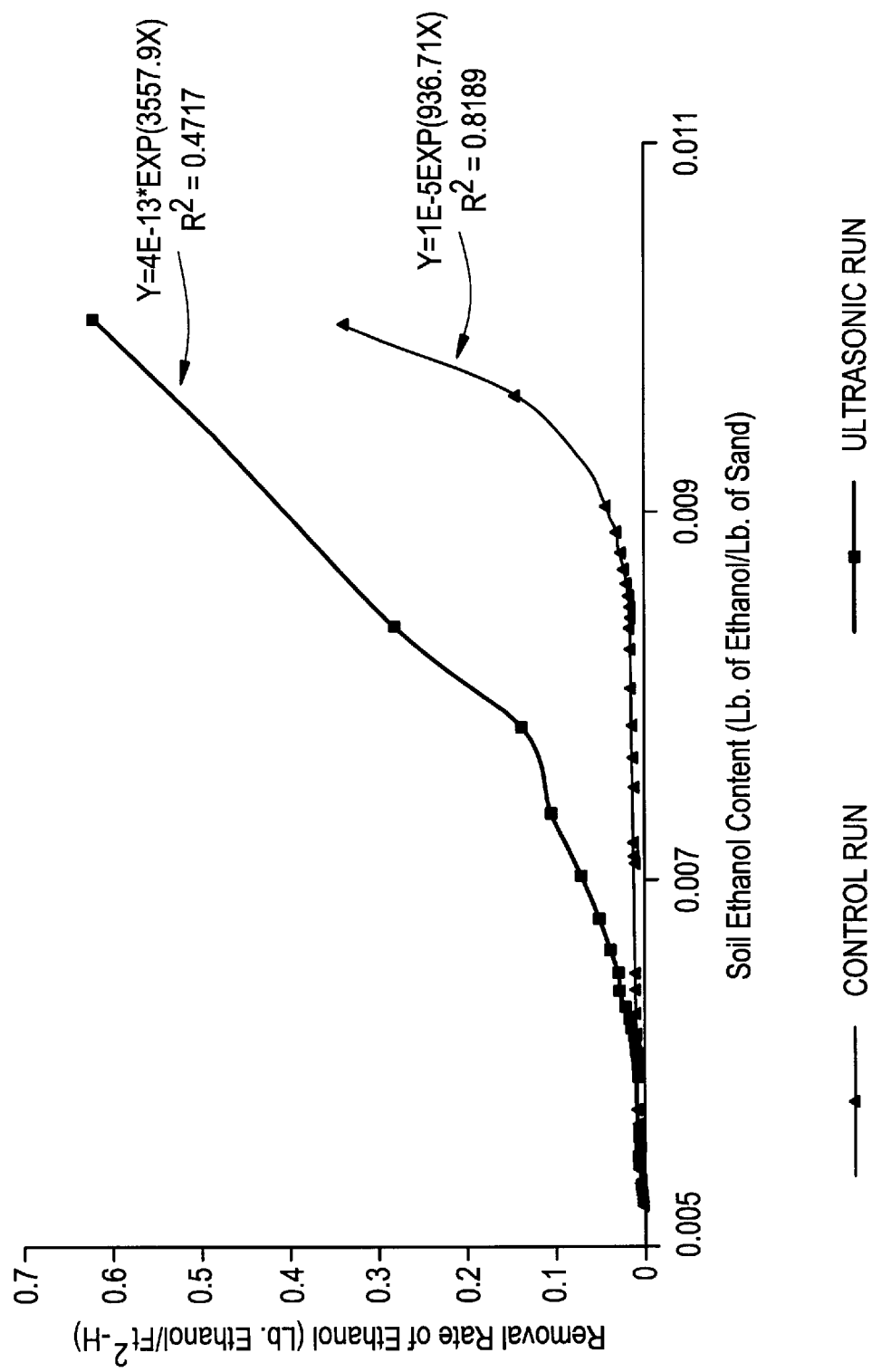
FIG. 7 is a graphical representation of the mass removal of ethanol achieved by an ultrasonic siren according to the present invention.
Figure 8:
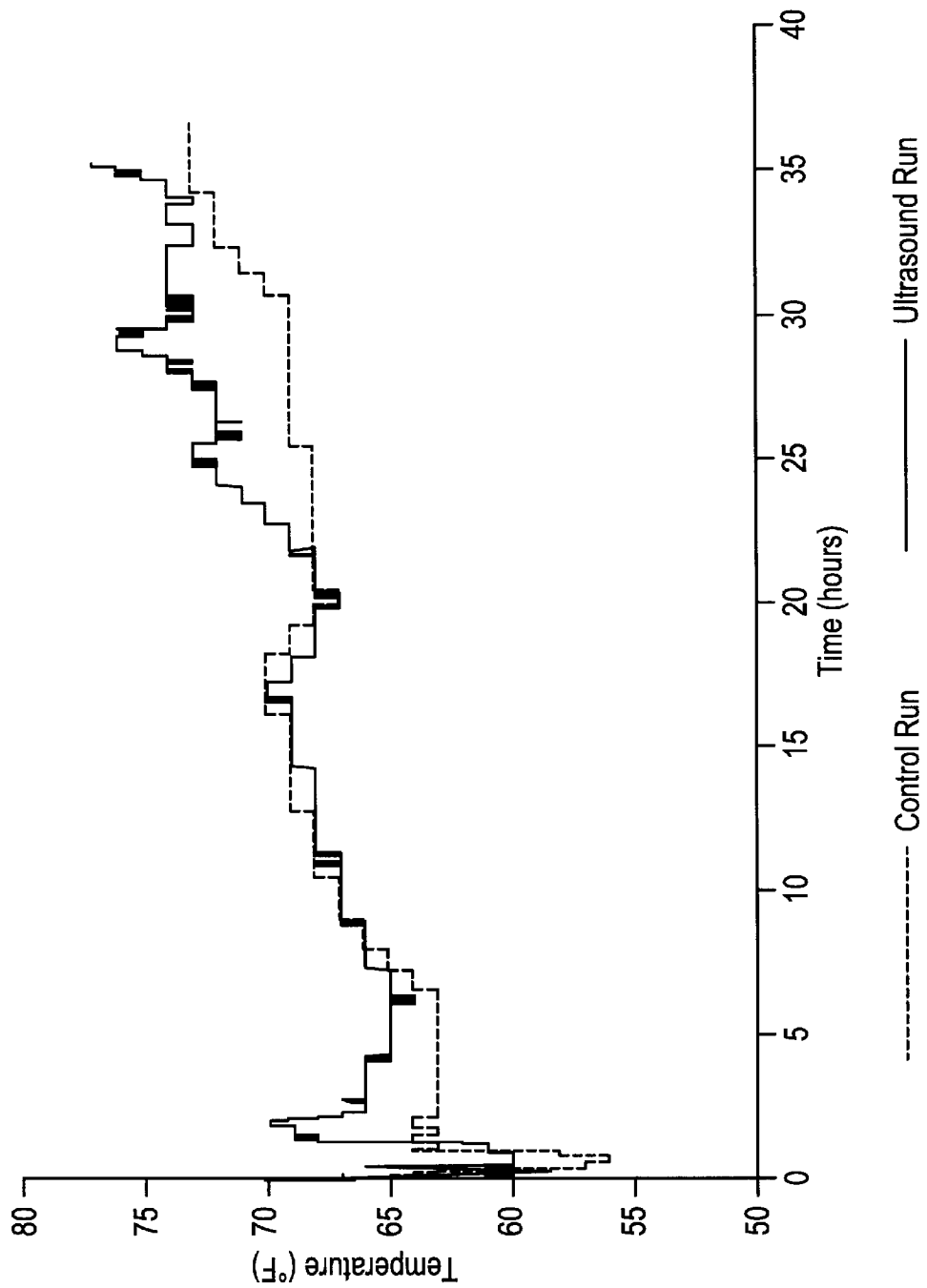
FIG. 8 is a graphical representation of the effluent gas temperature measured during testing of an ultrasonic siren according to the present invention.

FIG. 5 represents a test setup 100 in which bench scale tests of the siren and whistle were conducted in test cells 102 made from 1 foot by 1 foot by 2 foot Plexiglass™ sections filled with fine sand 104 and containing a simulated fracture 106 made out of a ½ inch thick geotextile. The ultrasonic device 108 was installed in the cell 102 and was aligned with the fracture 106. Experiments were conducted by forcing air 110 through the fracture 106 to strip the surrogate contaminant, in one case a mixture of ethyl alcohol and water from the soil. An inlet flow meter 112 and pressure guage 114 measured inlet air 110. Mass removal rate was monitored with a continuous reading gas chromatograph equipped with a flame ionization detector (GC/FID) from a sampling port 116, and an electronic scale. Outlet flows were measured by an outlet flow meter 118. Experimental runs were made using intermittent ultrasound, continuous ultrasound, and no ultrasound (control). Test results from a typical laboratory run are presented in FIGS. 6–9. FIGS. 6–8 correspond to testing of an ultrasonic siren device, while FIG. 9 corresponds to an ultrasonic whistle device. The mass removal graph of FIG. 6 exhibits similarities to the classical falling rate of a solid drying process. Therefore, the data were approximately represented by the exponential experimental of decay curves shown in FIG. 6. Experimental constants obtained from a regression analysis show a 75% improvement in mass removal rate with ultrasound. The data also showed that the time required to reach a residual mass of 1.0 pound in the control run was cut by a factor of 2 with ultrasound.

The data of FIGS. 6–9 was collected under the following experimental conditions:

Inlet Air Flow: 6.5 SCFM at 50 PSIG
Outlet Air Flow: 12.5 at 80In. $H_2O$
Fracture Pressure: 80In. At $H_2O$
Packing Density: 100lbs./$Ft^3$
Fracture Area: 1.56$Ft^2$
Liquid Content: 10% by Weight
Contaminants: 10% Ethanol and 90% Water by Weight The siren frequency of 18 Hz existed for FIGS. 6–8 with a siren sound level of ~125 dB for FIGS. 6–7 and ~160 for FIG. 8.

FIG. 7 shows the ethanol removal rate in the extracted vapor stream. It can be seen that VOCs were removed faster with ultrasound. Furthermore, the temperature was monitored in four places along the fracture to verify that the enhanced performance was due to sonic energy and not to a temperature gradient, as shown by the agreement in temperature between the control run and the ultrasound run shown in FIG. 8.

Figure 9:
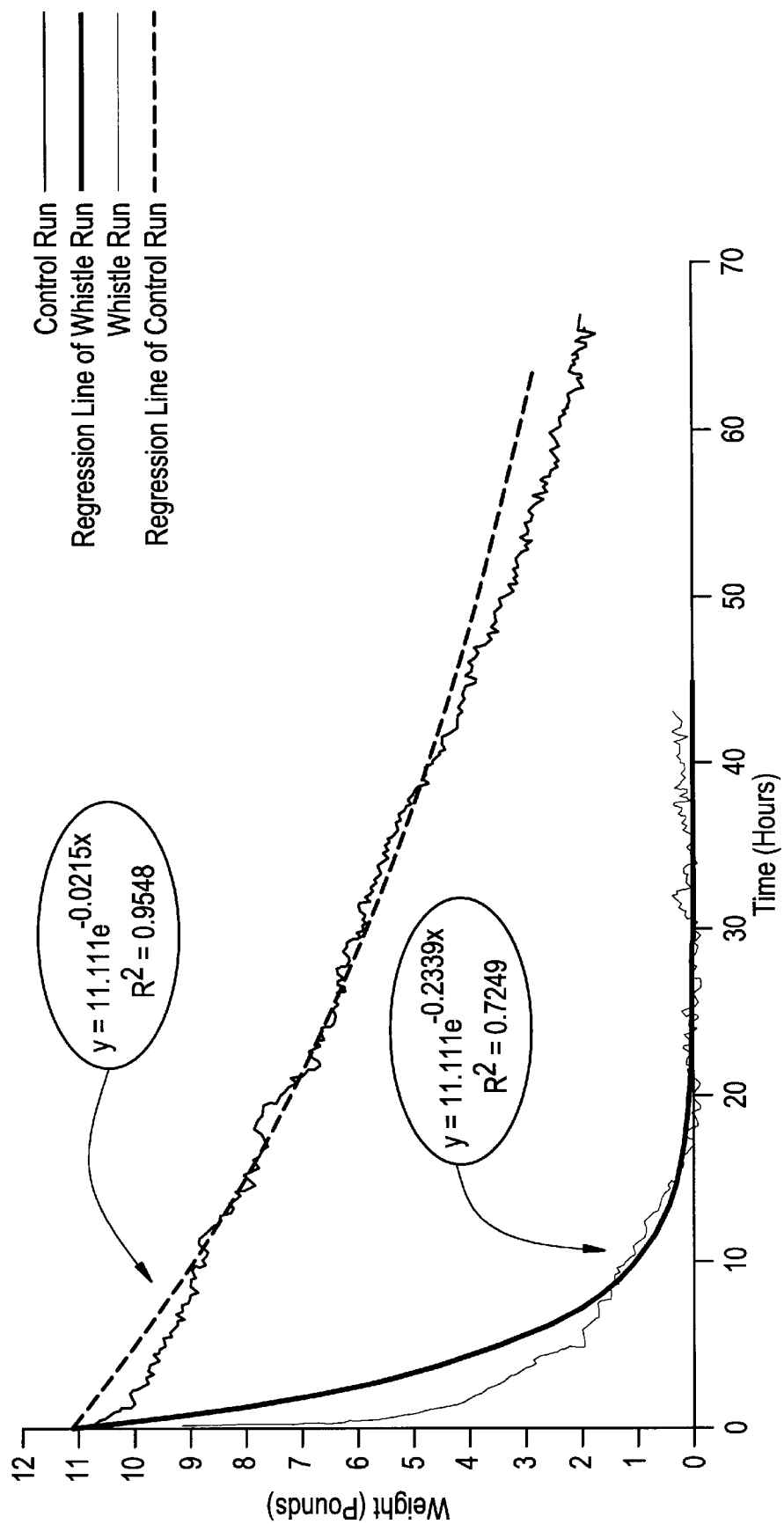
FIG. 9 is a graphical representation of the contaminant mass removal achieved by an ultrasonic whistle according to the present invention.

FIG. 9 shows test results from a typical laboratory run of the whistle. The whistle frequency was 11 kHz with a whistle sound level of ~160 dB. The mass removal graph exhibits similarity to the classical falling rate of a solid drying process. Accordingly, the data were approximated by the experimental decay curves shown in the Figure. The experimental constants from the regression analysis shows an estimated improvement in mass removal rate of approximately 600% with the ultrasonic whistle. FIG. 9 also shows that the time required to reach a residual mass of 1.0 pound in the control run (91% removal) was cut by a factor of 7 with ultrasound. Thus, the associated reduced clean up time represents significant savings.

Figure 10:
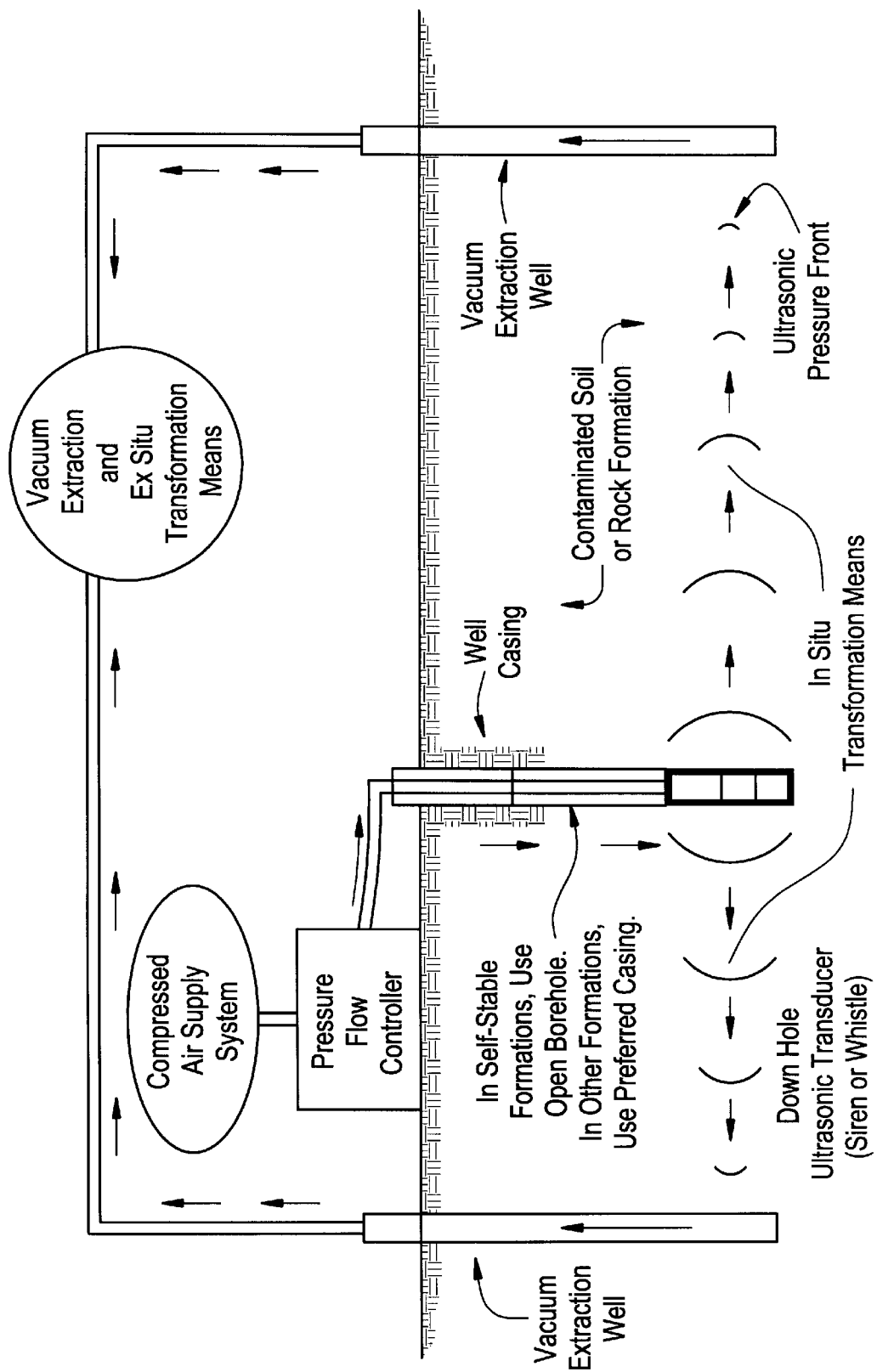
FIG. 10 is a schematic representation of an embodiment of the present invention as applied to a geologic formation.

As seen in FIG. 10, ultrasonic enhancement of removal of volatile organic compounds may be achieved in a geological formation having natural or artificial fractures in order to achieve maximum enhancement. The fractures can be created artificially, or the geologic formations may contain natural fractures such as bedrock, glacial tills, or over consolidated clays. In operation, the sonic device is lowered into the bore hole and aligned with the fracture. The sonic device is then activated by turning on the compressed air feed at the surface. The sound intensity is controlled by the pressure and the amount of air being fed to the device. Sonic energy then propagates through the fracture. Preferably the volatile organic compounds are removed through an extraction pipe some distance away. In the event that the bore hole or well is lined with a well casing, the down hole ultrasonic transducer should be located at a depth in the hole below the well casing, or in any event in an area where the well casing does not interfere with the sonic energy from the transducer. An ultrasonic pressure front is imposed on the contaminated soil or rock formation. In self-stable formations, it is preferable to use an open bore hole, i.e. without a casing. In other formations, it may be possible to use a perforated casing. As seen in FIG. 10, the ultrasonic enhancement system may further comprise a pressure flow controller which is used in conjunction with the compressed air supply system in order to regulate the pressure and flow of the air or compressed gas which is fed into the transducer.

Figure 11:
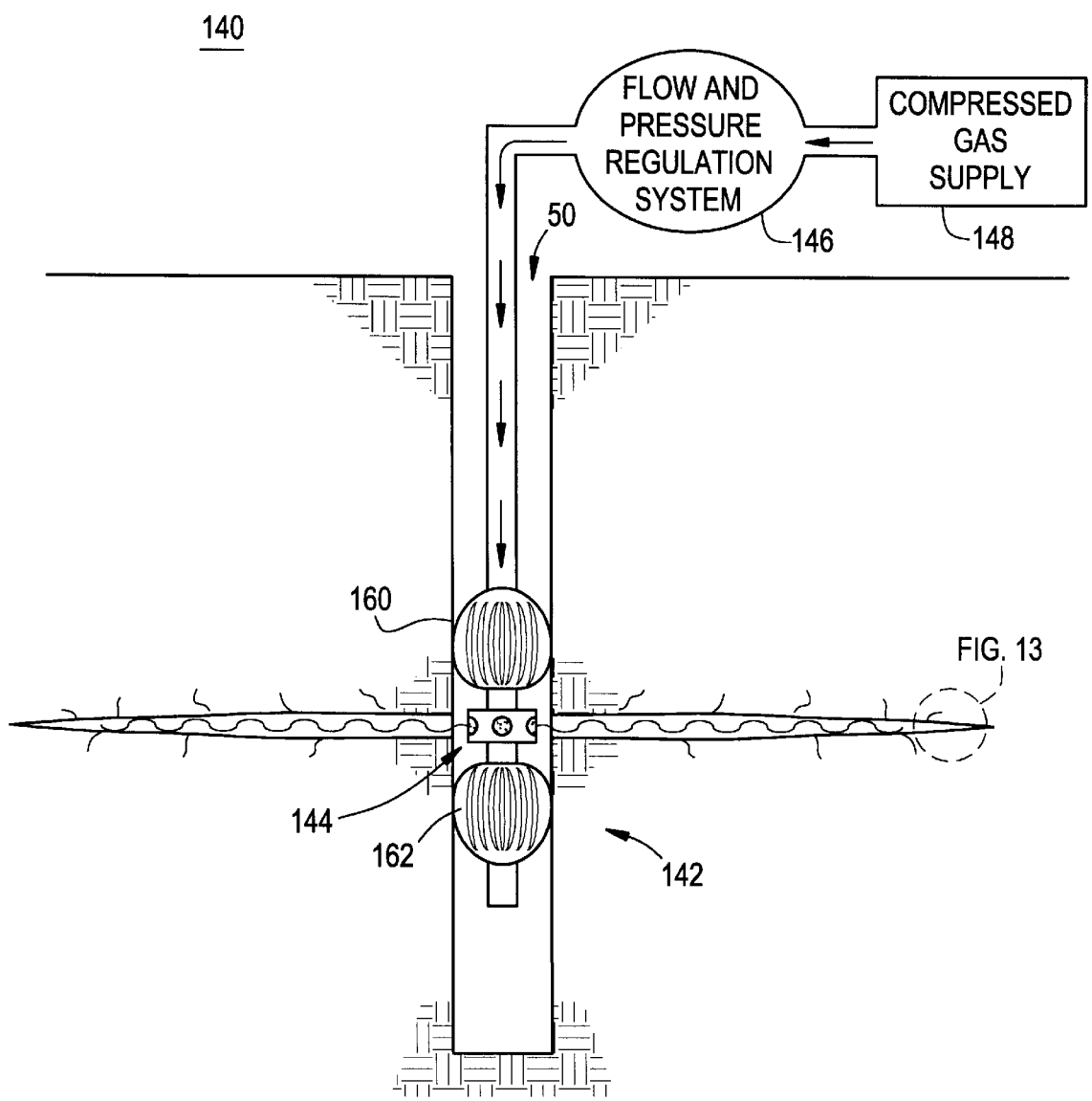
FIGS. 11–12 show a side elevational view of an embodiment of the present invention for simultaneously fracturing and applying sound based energy to a geologic formation.
Figure 12:
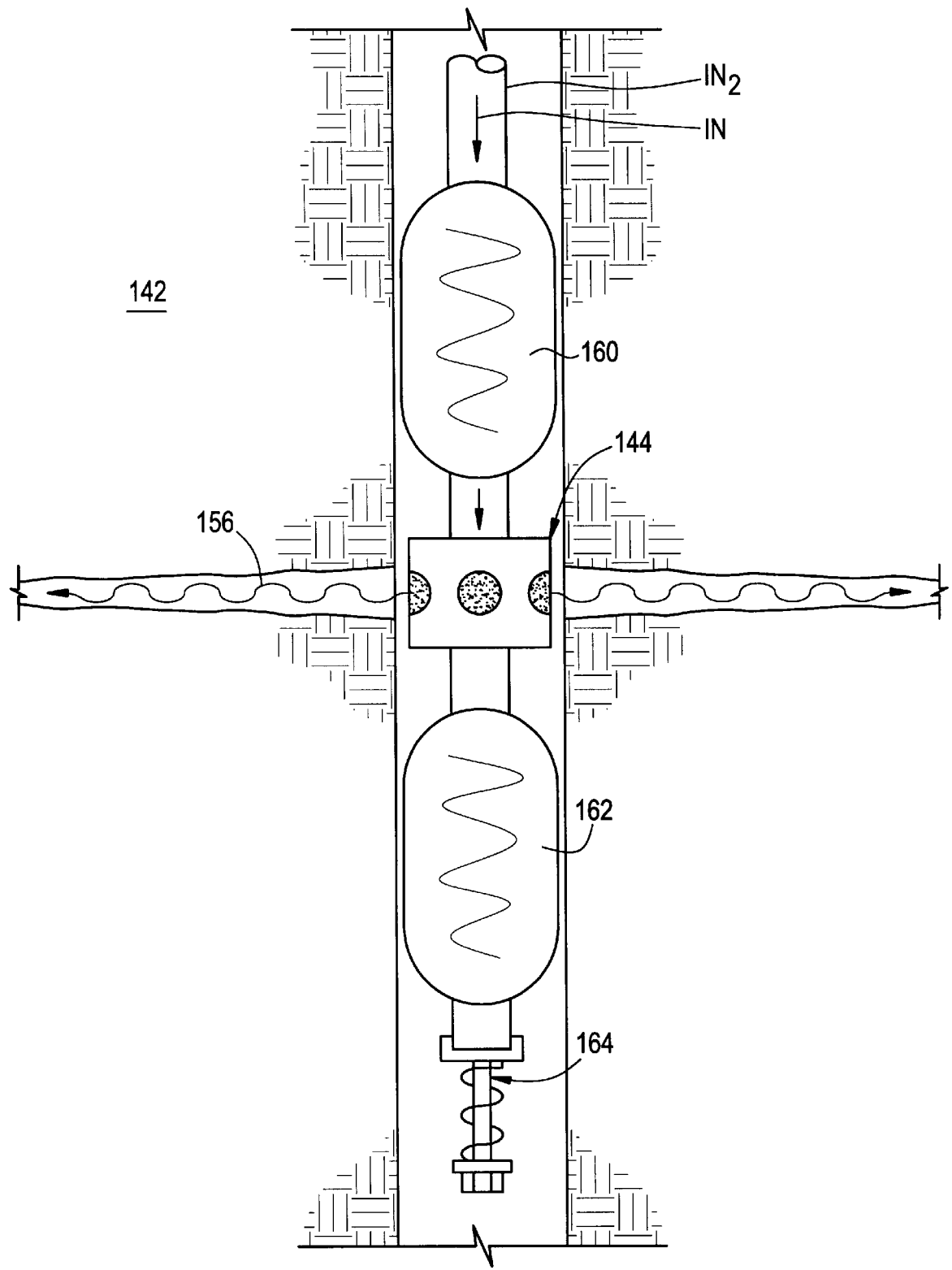

FIGS. 11–12 show an integrated pneumatic fracture and ultrasonic enhancement system 140 for use in a contaminated geologic formation. A bore hole 50 is drilled into the geologic formation to a desired depth. A head 142 is lowered into the bore hole 50, wherein the head 142 comprises a pneumatic fracture injector 144 with a high flow ultrasonic/sonic transducer nozzle. The head 142 is supplied with a compressed gas from a flow and pressure regulation system 146 which is connected to a compressed gas supply 148. The gas flows through the head 142 and into the bore hole 50 where the gas stream impinges upon the geologic formation.

Figure 13:
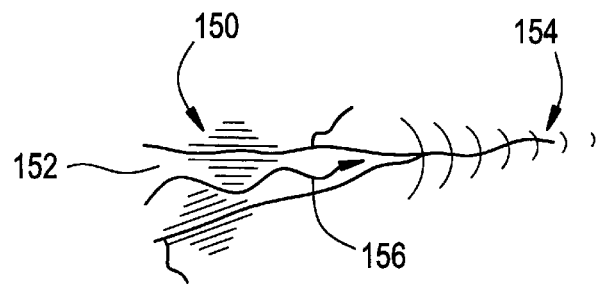
FIG. 13 illustrates the propagation of a fracture tip being assisted by pressurization and/or resonance established within a fracture by sound based vibrations.

As illustrated in FIG. 13, resonance, as indicated by lines 150, is preferably established in the interstice 152 of the formation and the surrounding body and a fracture tip 154 propagates through the formation, and the gas stream propagating the subsurface fracture will contain oscillatory wave energy, as represented by line 156, which can establish residence within the geologic medium. Such residence can result in larger fracture radii, and can create more secondary fractures in the formation.

After the fracturing is completed, a transformation means may be applied to the formation. Alternately, a transformation means may be applied simultaneously while fracturing is occurring in some part of the contaminated body. The initial excitation by ultrasonic/sonic energy will desorb and mobilize additional subsurface contaminants, resulting in faster removal or treatment. For example, in the case of vapor extraction, a flush surge of VOCs may be expected during early stages of system operation. Furthermore, a combined ultrasonic/sonic transducer and pneumatic fracturing head may result in lower compressed gas consumption. Typically, the gas flow rates required to propagate fractures with standard pneumatic fracturing equipment range from 1500 to 3000 standard cubic feet per minute (SCFM). Because of the increased fracture efficiency provided by the ultrasound or sound energy, the flow rate requirement of compressed gas may be reduced to 1000 to 2000 SCFM. Both the pneumatic fracturing component and the ultrasonic/sonic component may be actuated or powered by compressed gas, so that a single gas supply and/or gas supply line may furnish the power required by fracturing while sustaining the application of ultrasonic/sonic waves to the fractures/fractured material.

The pneumatic fracturing and ultrasonic enhancing apparatus 140 shown FIGS. 11–12 show upper and lower bore hole seals 160, 162, which are preferably expandable or inflatable. A head 142 may be equipped with a transducer nozzle which effectively emits ultrasonic/sonic energy in the form of a transverse gas stream around the entire circumference (360 degrees) of the head. The head 142 may also be adapted to focus the injected air stream in a more narrow direction, such as substantially limiting the airstream to a selected quadrant. The head 142 may further comprise a spring and rod plunger system 164 to allow articulation of the upper and lower seals 160, 162. Either a whistle or a siren design may be used for the transducer. If the transducer is adapted to both fracture and transmit ultrasonic/sonic energy through a geologic formation or similar body, the siren or whistle must be adapted to accommodate high gas flow rates which are required to fracture the formation. For example, an ultrasonic/sonic transducer intended for use in a previously fractured body may require 100 SCFM to operate, while a transducer which emits ultrasonic/sonic energy and simultaneously fractures the formation may require 1000 to 2000 SCFM.

Figure 14:
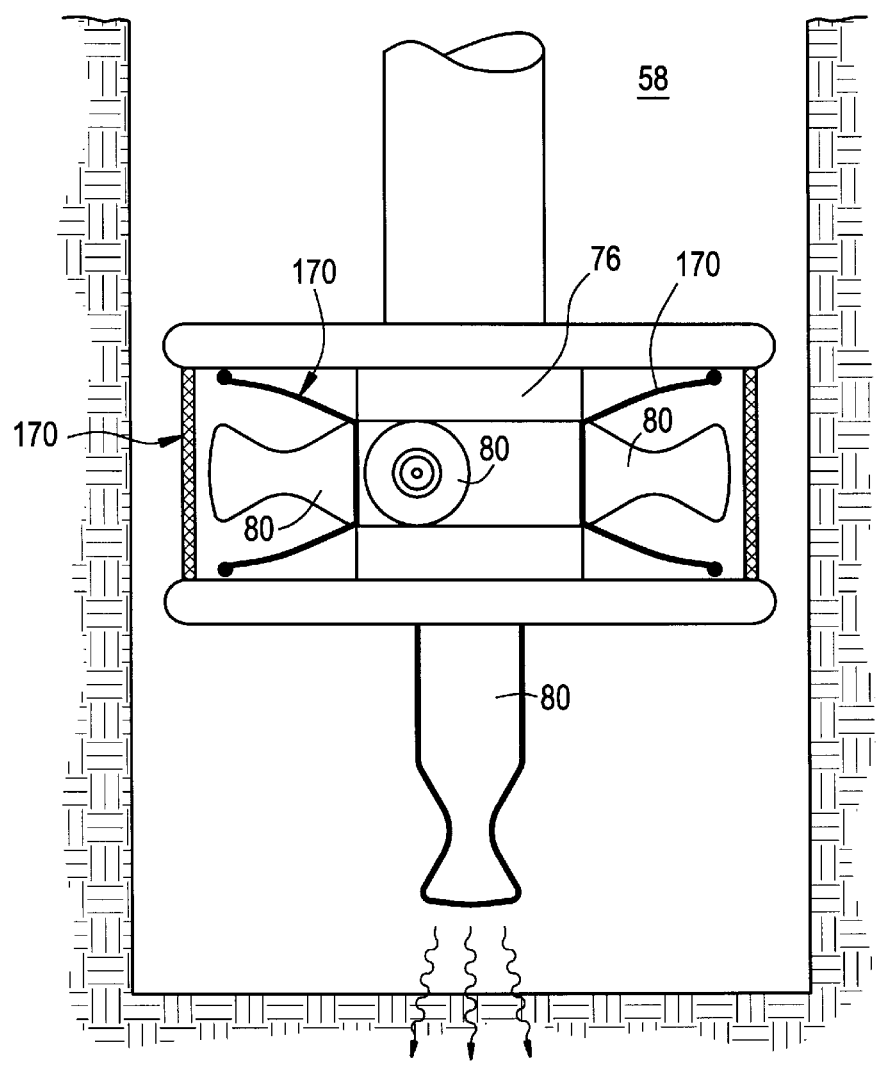
FIG. 14 shows a particular embodiment of the present invention having a generally vertically oriented sonic transducer and reflectors.

FIG. 14 shows a particular embodiment of the present invention comprising a probe head 58 having a plurality of ultrasonic whistle transducers 80, including a generally downward projecting whistle transducer 80. Thus, when the probe head 58 is positioned near the bottom of a bore hole, one or more whistles 80 may be directed downwardly to energize the contaminants in the zone beneath the bore hole. Such an application of sonic energy would be particularly effective in bodies or formations which contain one or more interstices disposed beneath the bottom of the bore hole. For example a geologic formation may contain vertical fractures instead of, or in addition to, horizontally oriented fractures. Treatment or removal of the contaminants may be further effected by a transformation means or extraction means.

FIG. 14 also shows a particular embodiment of the present invention comprising a plurality of ultrasonic whistles 80 which are optionally at least partially surrounded by reflectors 170, preferably parabolic-shaped reflectors, to capture reflected sonic waves and concentrate the waves back toward the body being treated. Thus, the reflectors 170 enhance the ability of the probe head to focus sonic/ultrasonic energy toward the contaminant. Furthermore, a circumferential screen 172 is disposed around the ultrasonic whistles 80 and reflectors 170 to help prevent foreign matter from entering the transducer area.

Figure 15:
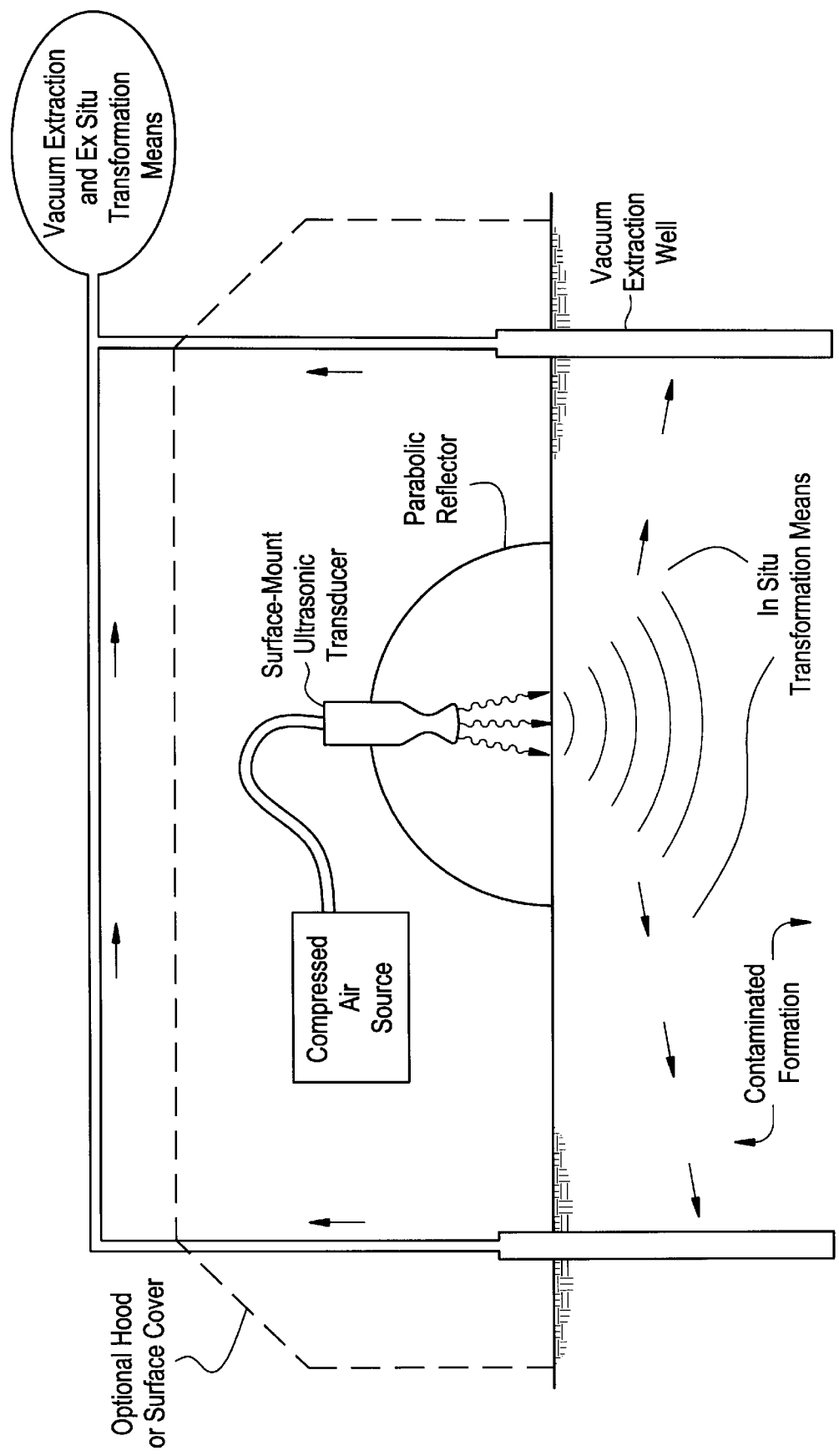
FIG. 15 illustrates a surface mounted transducer system according to a particular embodiment of the present invention.

FIG. 15 illustrates yet another embodiment of the present invention wherein a sonic/ultrasonic probe or transducer is disposed at the surface of a contaminated body. The transducer is preferably fitted with a parabolic reflector for focusing the sonic/ultrasonic energy toward the body. A compressed air source delivers a flow of air, regulated by the pressure and flow regulator, to the transducer. Such a surface mounted transducer system would be particularly suitable for contaminants which are disposed near the surface of the body. A transformation means may be located below the surface of the body to remove or treat the contaminants, particularly in order to avoid release of the contaminants into the atmosphere or the surrounding environment. Alternatively, or in addition, a hood or other covering could be installed in order to capture and treat contaminants, for example, volatilized contaminants.

Figure 16:
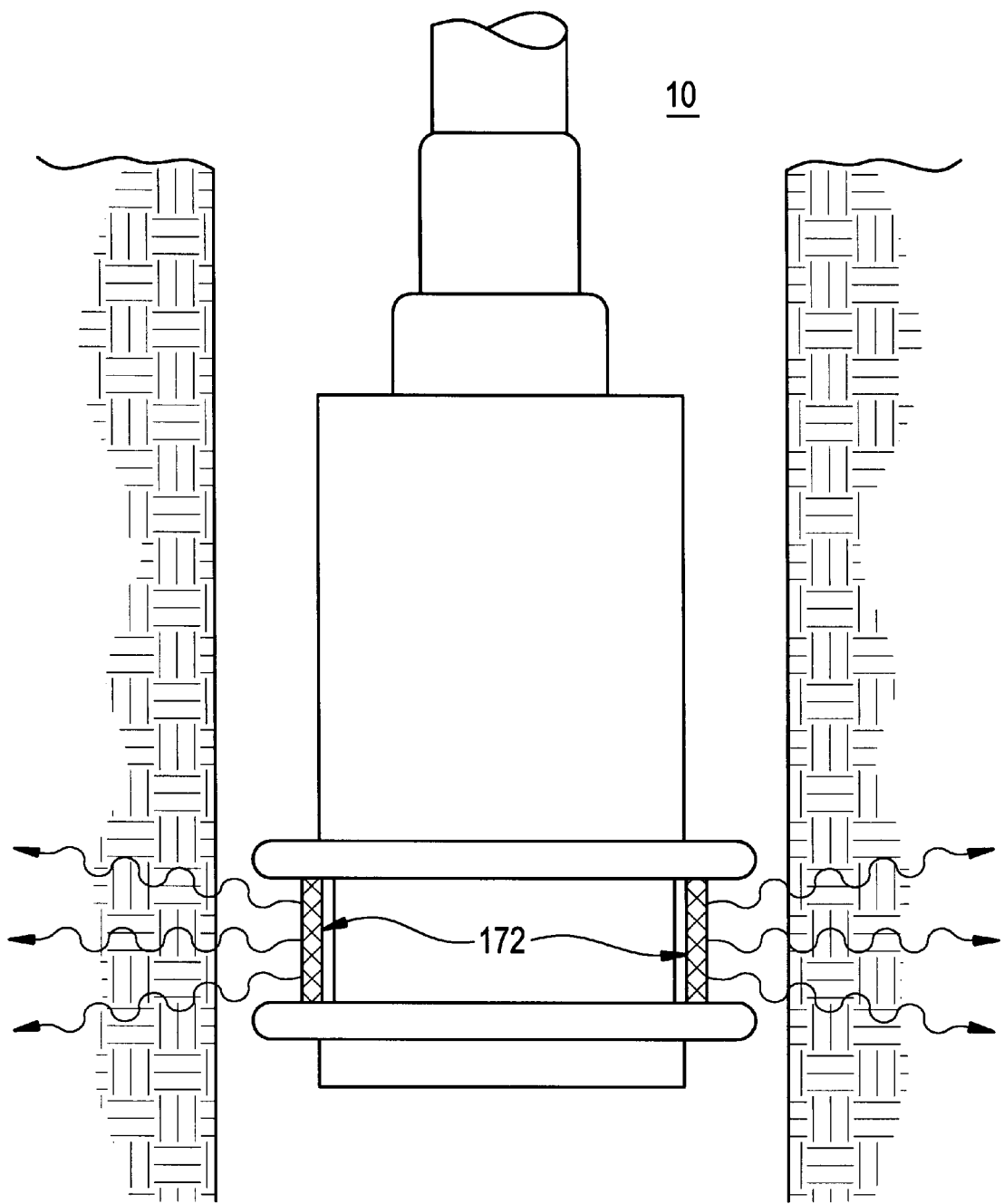
FIG. 16 is a partially cut-away side elevational view of a particular embodiment of the present invention having a screen disposed around sonic transducers.

FIG. 16 shows a probe head 10 according to a particular embodiment of the present invention having a circumferential screen 172 disposed around the ultrasonic transducers to help prevent particulates from interfering with the operation of the transducers. In self-stable formations where a bore hole will remain open, the screen 172 may be attached to the transducer or the head.

Figure 17:
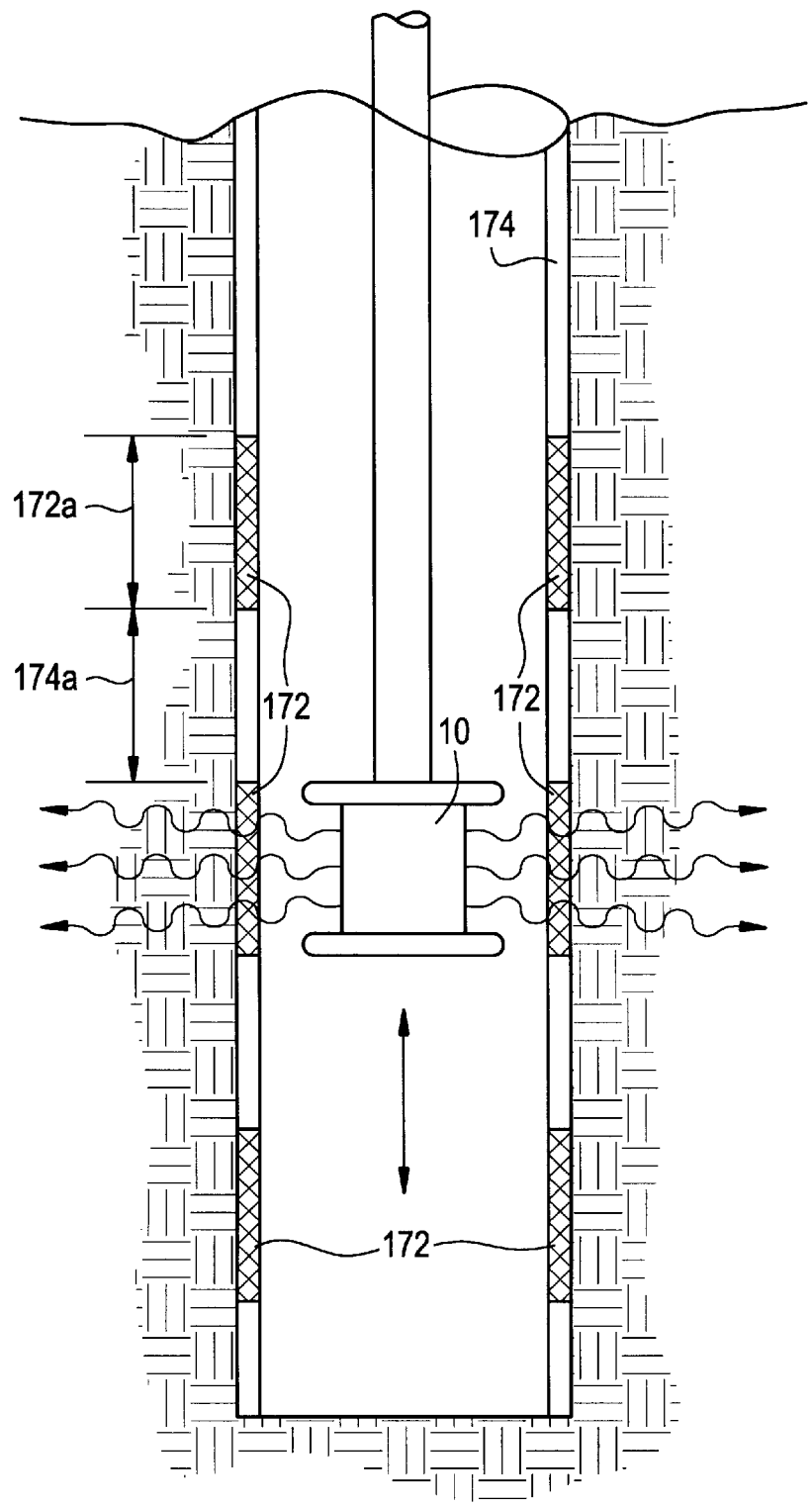
FIG. 17 is a side elevational view of a particular embodiment of the present invention wherein a transducer is used in conjunction with a well casing having intermittent screens disposed therein.

As seen in FIG. 17, in formations which are self-stable, the screen 172 may be incorporated into a support casing or pipe 174, whether at selected intervals (as represented by sections 172a and 174a) or along the entire length of the casing or pipe as determined, for example, by the nature of the formation or body and the distribution of the contamination.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

What is claimed is:

1. An apparatus, for use with a pressurized gas source, for enhancing the in situ removal of at least one contaminant from a contaminated body, said body being provided with at least one borehole, said apparatus comprising:

at least one head adapted to fit within said borehole, said head comprising:
  means for generating and emitting vibratory sound energy; and
  means for pneumatically fracturing at least a portion of said body; and
means for supplying pressurized gas to said head from said gas source;

wherein said apparatus simultaneously creates at least one interstice in said body and focuses vibrations toward said interstice, thereby exciting said contaminant contained within said body, whereby transport of said contaminant out of said body is facilitated.

2. The apparatus according to claim 1 further comprises means for transforming said contaminant into a different state.

3. A contaminant removal means for enhancing the in situ removal of at least one contaminant from a contaminated body, said body being provided with at least one interstice, by generating and focusing vibrations toward said interstice, thereby exciting said contaminant within said body, whereby transport of said contaminant out of said body is facilitated; and wherein said contaminant removal means further includes an ultrasonic siren.

4. The contaminant removal means according to claim 3 wherein said body further comprises a geologic formation.

5. The contaminant removal means according to claim 3 wherein said body further comprises at least one porous portion.

6. The contaminant removal means according to claim 3 wherein said body is at least partially saturated with a liquid.

7. The contaminant removal means according to claim 3 wherein said contaminant removal means further comprises means for forcing a gas into said interstice.

8. The contaminant removal means according to claim 3 further comprising a vacuum extraction means.

9. The contaminant removal means according to claim 3 further comprising a transformation means.

10. The contaminant removal means according to claim 9 wherein said transformation means further comprises biodegradation means.

11. The contaminant removal means according to claim 9 wherein said transformation means further comprises thermal treatment means.

12. The contaminant removal means according to claim 3 wherein said contaminant resides in said body at least partially in a liquid phase.

13. The contaminant removal means according to claim 3 wherein said contaminant resides in said body at least partially in a solid phase.

14. The contaminant removal means according to claim 3 wherein said contaminant resides in said body at least partially in a gaseous phase.

15. A contaminant removal means for enhancing the in situ removal of at least one contaminant from a contaminated body, said body being provided with at least one interstice, by generating and focusing vibrations toward said interstice, thereby exciting said contaminant within said body, whereby transport of said contaminant out of said body is facilitated; and wherein said contaminant removal means further includes an ultrasonic whistle.

16. The contaminant removal means according to claim 15 wherein said body further comprises a geologic formation.

17. The contaminant removal means according to claim 15 wherein said body further comprises at least one porous portion.

18. The contaminant removal means according to claim 15 wherein said body is at least partially saturated with a liquid.

19. The contaminant removal means according to claim 15 wherein said contaminant removal means further comprises means for forcing a gas into said interstice.

20. The contaminant removal means according to claim 15 further comprising a vacuum extraction means.

21. The contaminant removal means according to claim 15 further comprising a transformation means.

22. The contaminant removal means according to claim 21 wherein said transformation means further comprises biodegradation means.

23. The contaminant removal means according to claim 21 wherein said transformation means further comprises thermal treatment means.

24. The contaminant removal means according to claim 15 wherein said contaminant resides in said body at least partially in a liquid phase.

25. The contaminant removal means according to claim 15 wherein said contaminant resides in said body at least partially in a solid phase.

26. The contaminant removal means according to claim 15 wherein said contaminant resides in said body at least partially in a gaseous phase.

27. An apparatus for introducing vibratory sound energy into at least one discrete zone in a geologic formation, said geologic formation being provided with at least one borehole, said apparatus comprising:

at least one head for generating vibratory sound energy, said head being adapted to fit within said borehole;

placement means for placing said head in said borehole at a desired depth;

wherein said head is capable of being placed in proximity with said discrete zone;

whereby said apparatus is capable of generating and focusing vibratory sound energy in the vicinity of said discrete zond; and wherein said head further includes an ultrasonic siren or ultrasonic whistle.

28. The apparatus according to claim 27 wherein said head directs said vibratory sound energy in a direction generally transverse to the direction of said borehole.

29. The apparatus according to claim 27 wherein said placement means further comprises supply means for supplying said head with energy.

30. A method for enhancing the removal of at least one contaminant from a contaminated geologic formation, the method comprising:

introducing vibratory sound energy into at least one discrete zone in the geologic formation; and fracturing at least a part of said geologic formation.

31. The method according to claim 30 wherein said geologic formation is provided with at least one interstice, and wherein said vibratory sound energy is directed toward said interstice.

32. The method according to claim 30 wherein said geologic formation is provided with at least one borehole, and wherein said vibratory sound energy is generated within said borehole.

33. The method according to claim 30 wherein said vibratory sound energy is directed generally transversely to the direction of the borehole.

34. The method according to claim 30 wherein said vibrations further comprise sonic or ultrasonic vibrations.

35. The method according to claim 30 wherein said method further comprises forcing a gas into said interstice.

36. The method according to claim 30 wherein said method further comprises applying vacuum extraction to said body.

37. The method according to claim 30 wherein said method further comprises transforming said contaminant.

38. A method for enhancing the in situ removal of at least one contaminant from a contaminated body with a probe head, said body being provided with at least one borehole, said probe being adapted to fit within said borehole, said method comprising:

placing said head in said borehole;

providing pressurized gas to said head; and pneumatically generating vibratory sound energy in said head from at least a portion of said pressurized gas and emitting said energy from said head into said body.

39. The method according to claim 38 further comprising pneumatically fracturing at least a portion of said body with at least a portion of said pressurized gas.

40. The method according to claim 38 further comprising simultaneously creating at least one interstice in said body and directing said vibratory sound energy toward said interstice, thereby exciting said contaminant contained within said body, whereby transport of said contaminant out of said body is facilitated.

41. A method for enhancing the removal of at least one contaminant from a contaminated geologic formation, the method comprising:

introducing vibratory sound energy into at least one discrete zone in the geologic formation; and simultaneously inducing at least one fracture in said body.

42. The method according to claim 41 wherein said geologic formation is provided with at least one interstice, and wherein said vibratory sound energy is directed toward said interstice.

43. The method according to claim 41 wherein said geologic formation is provided with at least one borehole, and wherein said vibratory sound energy is generated within said borehole.

44. The method according to claim 41 wherein said vibratory sound energy is directed generally transversely to the direction of the borehole.

45. The method according to claim 41 wherein said vibrations further comprise sonic or ultrasonic vibrations.

46. The method according to claim 41 wherein said method further comprises forcing a gas into said interstice.

47. The method according to claim 41 wherein said method further comprises applying vacuum extraction to said body.

48. The method according to claim 41 wherein said method further comprises transforming said contaminant.

\* \* \* \* \*